United States Patent
Hwang et al.

(10) Patent No.: US 11,870,571 B2
(45) Date of Patent: Jan. 9, 2024

(54) METHOD AND APPARATUS FOR DETERMINING FEEDBACK RESOURCE IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/967,055

(22) Filed: Oct. 17, 2022

(65) Prior Publication Data

US 2023/0052408 A1 Feb. 16, 2023

Related U.S. Application Data

(63) Continuation of application No. 17/543,263, filed on Dec. 6, 2021, now Pat. No. 11,476,976, which is a (Continued)

(30) Foreign Application Priority Data

Jul. 10, 2019 (KR) .......................... 10-2019-0083338
Dec. 26, 2019 (KR) .......................... 10-2019-0175223

(51) Int. Cl.
*H04L 12/28* (2006.01)
*H04L 1/00* (2006.01)
(Continued)

(52) U.S. Cl.
CPC .......... *H04L 1/0055* (2013.01); *H04L 1/1812* (2013.01); *H04W 72/02* (2013.01); *H04W 72/0453* (2013.01); *H04W 4/40* (2018.02)

(58) Field of Classification Search
CPC ............... H04L 1/1812; H04L 5/0055; H04W 72/0466; H04W 72/40; H04W 92/18
(Continued)

(56) References Cited

U.S. PATENT DOCUMENTS

2016/0073408 A1  3/2016  Sartori et al.
2020/0106566 A1  4/2020  Yeo et al.
(Continued)

FOREIGN PATENT DOCUMENTS

KR   20170108987   9/2017
KR   20190008387   1/2019
(Continued)

OTHER PUBLICATIONS

NTT Docomo, Inc., "NR Sidelink Physical Layer Procedure," R1-1906209, 3GPP TSG RAN WG1 #97, Reno, US, May 13-17, 2019, 12 pages.
(Continued)

*Primary Examiner* — John Pezzlo
(74) *Attorney, Agent, or Firm* — Fish & Richardson P.C.

(57) ABSTRACT

A method for performing, by a first device, wireless communication and an apparatus for supporting same are provided. The method includes: receiving a physical sidelink shared channel (PSSCH) from a second device; determining a physical sidelink feedback channel (PSFCH) resource associated with the PSSCH; and transmitting, to the second device, a hybrid automatic repeat request (HARQ) feedback on the PSFCH resource. Here, at least one subchannel for the PSSCH is associated with at least one first PSFCH resource including at least one second PSFCH resource, each second PSFCH resource included in the at least one first PSFCH resource is associated with each slot on the at least one subchannel, and the PSFCH resource may be determined on the basis of information related to the at least one subchannel for the PSSCH, information related to at least one slot for the PSSCH, and a source ID of the second device.

20 Claims, 29 Drawing Sheets

Related U.S. Application Data continuation of application No. PCT/KR2020/008058, filed on Jun. 22, 2020.

(60) Provisional application No. 62/938,947, filed on Nov. 21, 2019.

(51) Int. Cl.

| | | |
|---|---|---|
| *H04L 1/1812* | (2023.01) | |
| *H04W 72/02* | (2009.01) | |
| *H04W 72/0453* | (2023.01) | |
| *H04J 1/16* | (2006.01) | |
| *H04W 4/40* | (2018.01) | |

(58) Field of Classification Search
USPC .................................. 370/252, 329, 442
See application file for complete search history.

(56) References Cited

U.S. PATENT DOCUMENTS

| | | | | |
|---|---|---|---|---|
| 2020/0205165 | A1* | 6/2020 | Huang | H04L 1/1854 |
| 2020/0205166 | A1* | 6/2020 | Huang | H04W 76/27 |
| 2020/0305126 | A1 | 9/2020 | Li et al. | |
| 2020/0351033 | A1 | 11/2020 | Ryu et al. | |
| 2020/0351057 | A1* | 11/2020 | Yeo | H04L 5/0087 |
| 2020/0403737 | A1* | 12/2020 | Yeo | H04L 1/1861 |
| 2020/0404626 | A1 | 12/2020 | Wu et al. | |
| 2021/0007096 | A1* | 1/2021 | Huang | H04L 5/0055 |
| 2021/0306824 | A1 | 9/2021 | Li et al. | |
| 2022/0077970 | A1 | 3/2022 | Wu et al. | |
| 2022/0201654 | A1* | 6/2022 | Lee | H04L 1/1864 |
| 2022/0210768 | A1* | 6/2022 | Zhou | H04W 4/40 |
| 2022/0217679 | A1* | 7/2022 | Zhao | H04W 4/70 |

FOREIGN PATENT DOCUMENTS

| | | |
|---|---|---|
| WO | WO2018004322 | 1/2018 |
| WO | WO2020210333 | 10/2020 |
| WO | WO2020228772 | 11/2020 |

OTHER PUBLICATIONS

Office Action in Japanese Appln. No. 2022-500957, dated Jan. 31, 2023, 8 pages (with English translation).
CATT, "Sidelink physical layer structure in NR V2X," R1-1906314, Presented at 3GPP TSG RAN WG1 Meeting #97, Reno, USA, May 13-17, 2019, 15 pages.
CMCC, "Discussion on sidelink resource allocation mechanism," R1-1906515, Presented at 3GPP TSG RAN WG1 #97, Reno, USA, May 13-17, 2019, 4 pages.
Ericsson, "PHY layer procedures for NR sidelink," 3GPP TSG-RAN WG1 Meeting #98bis, R1-1910538, Chongqing, China, Oct. 14-20, 2019, 14 pages.
Extended European Search Report in European Application No. 20836869.6, dated Jul. 1, 2022, 11 pages.
Huawei & HiSilicon, "Design and contents of PSCCH and PSFCH," R1-1903071, Presented at 3GPP TSG RAN WG1 Meeting #96, Athens, Greece, Feb. 25-Mar. 1, 2019, 10 pages.
Huawei & HiSilicon, "Design and contents of PSCCH and PSFCH," R1-1904689, Presented at 3GPP TSG RAN WG1 Meeting #96bis, Xi'an, China, Apr. 8-12, 2019, 9 pages.
Huawei, HiSilicon, "Sidelink physical layer procedures for NR V2X," 3GPP TSG RAN WG1 Meeting #97, R1-906008, Reno, USA, May 13-17, 2019, 23 pages.
InterDigital Inc., "On Physical Layer Procedures for NR V2X Sidelink," R1-195405, Presented at 3GPP TSG RAN WG1 #96bis, Xi'an, China, Apr. 8-12, 2019, 9 pages.
InterDigital, Inc., "On Physical Layer Procedures for NR V2X Sidelink," R1-1907096, 3GPP TSG RAN WG1 #97, Reno, USA, May 13-17, 2019, 9 pages.
LG Electronics, "Discussion on physical layer procedure for NR V2X," R1-1900648, Presented at 3GPP TSG RAN WG1 Meeting AH 1901, Taipei, Taiwan, Jan. 21-25, 2019, 10 pages.
MediaTek Inc., "On sidelink mode-2 resource allocation," R1-1906555, Presented at 3GPP TSG RAN WG1 Meeting #97, Reno, USA, May 13-17, 2019, 8 pages.
MediaTek Inc., "On sidelink resource allocation mechanism," R1-1904494, Presented at 3GPP TSG RAN WG1 Meeting #96bis, Xian, China, Apr. 8-12, 2019, 9 pages.
Nokia & Nokia Shanghai Bell, "Discussion of physical layer structure for sidelink," R1-1906074, Presented at 3GPP TSG RAN WG1 #97, Reno, USA, May 13-17, 2019, 18 pages.
Notice of Allowance in Korean Appln. No. 10-2021-7038700, dated Jan. 21, 2022, 4 pages (with English translation).
Panasonic, "Discussion on PSFCH channel design in NR V2X," R1-1902202, Presented at 3GPP TSG RAN WG1 #96, Athens, Greece, Feb. 25-Mar. 1, 2019, 4 pages.
Samsung, "On Sidelink HARQ Procedure," 3GPP TSG TAN WG1 #97, R1-1906948, Reno, USA, May 13-17, 2019, 11 pages.
Samsung, "On Physical Layer Procedures for NR V2X," R1-1901048, Presented at 3GPP TSG RAN WG1 Ad-Hoc Meeting 1901, Taipei, Taiwan, Jan. 21-25, 2019, 11 pages.

* cited by examiner

FIG. 4
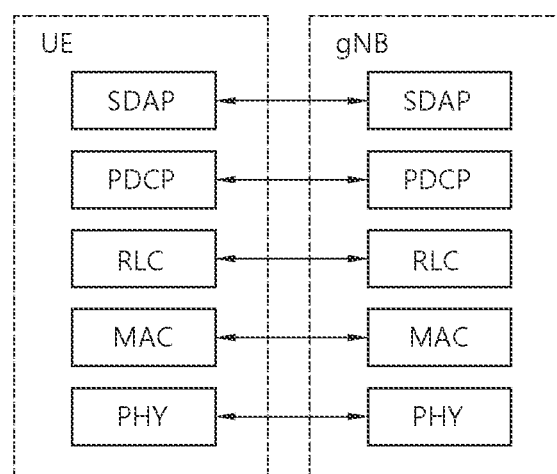
(a)
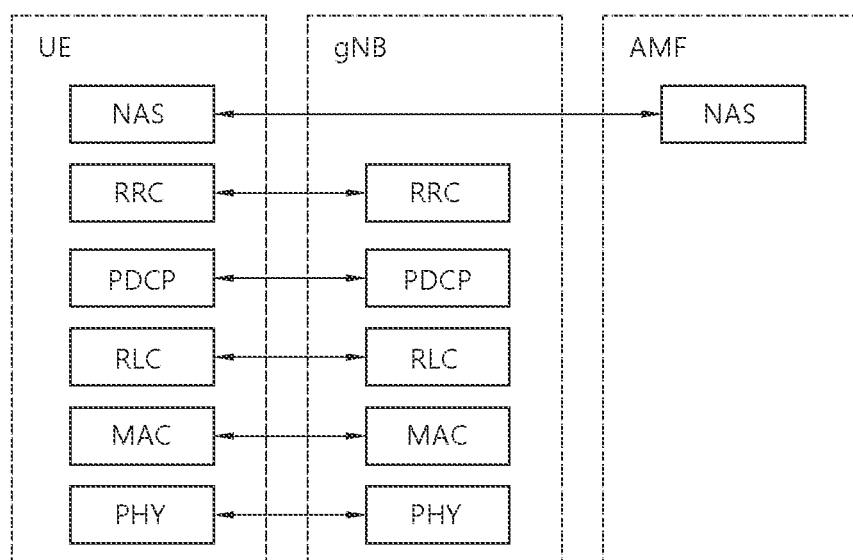
(b)

FIG. 8
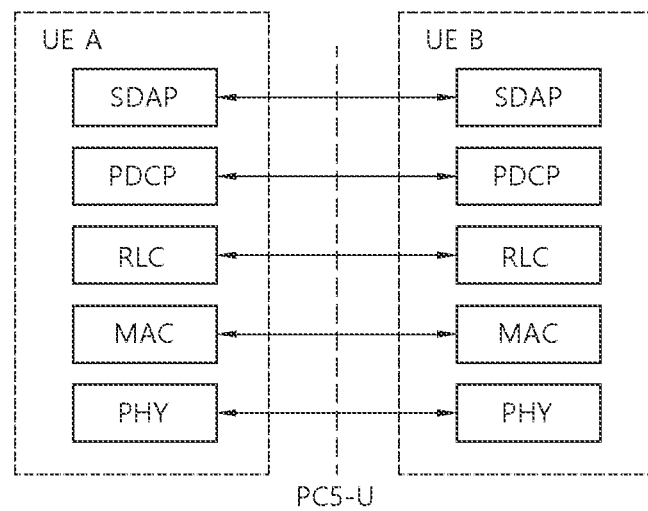
(a)
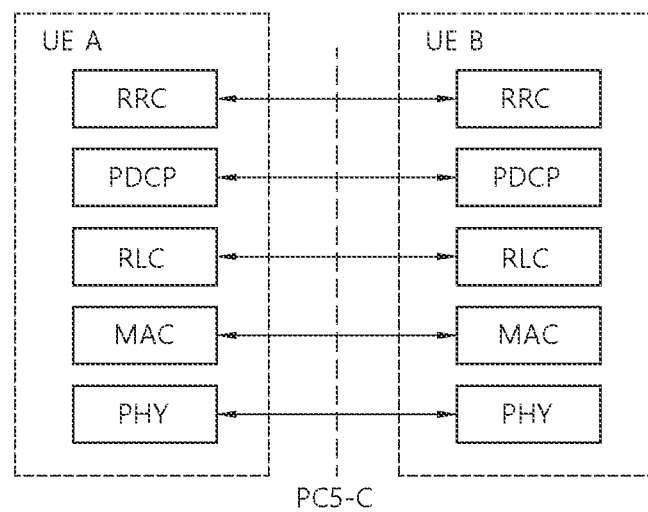
(b)

METHOD AND APPARATUS FOR DETERMINING FEEDBACK RESOURCE IN NR V2X

CROSS-REFERENCE TO RELATED APPLICATIONS

This application is a continuation of U.S. application Ser. No. 17/543,263, filed on Dec. 6, 2021, which is a continuation pursuant to 35 U.S.C. § 119(e) of International Application PCT/KR2020/008058, with an international filing date of Jun. 22, 2020, which claims the benefit of U.S. Provisional Patent Application No. 62/938,947, filed on Nov. 21, 2019, Korean Patent Application No. 10-2019-0083338, filed on Jul. 10, 2019 and Korean Patent Application No. 10-2019-0175223, filed on Dec. 26, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB), SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, a UE transmitting a PSSCH may receive a PSFCH related to the PSSCH. Therefore, the UE needs to efficiently determine resource(s) for the PSFCH.

Technical Solutions

In one embodiment, a method for performing, by a first device, wireless communication is provided. The method may comprise: receiving, from a second device, a physical sidelink shared channel (PSFCH); determining a physical sidelink feedback channel (PSFCH) resource related to the PSFCH; and transmitting, to the second device, hybrid automatic repeat request (HARQ)) feedback based on the PSFCH resource. Herein, at least one subchannel for the PSSCH may be related to at least one first PSFCH resource including at least one second PSFCH resource, and each second PSFCH resource included in the at least one first PSFCH resource may be related to each slot on the at least one subchannel, and the PSFCH resource may be determined based on information related to the at least one subchannel for the PSSCH, information related to at least one slot for the PSSCH, and a source ID of the second device.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a second device, a physical sidelink shared channel (PSSCH); determine a physical sidelink feedback channel (PSFCH) resource related to the PSSCH; and transmit, to the second device, hybrid automatic repeat request (HARQ) feedback based on the PSFCH resource. Herein, at least one subchannel for the PSSCH may be related to at least one first PSFCH resource including at least one second PSFCH resource, and each second PSFCH resource included in the at least one first PSFCH resource may be related to each slot on the at least one subchannel, and the PSFCH resource may be determined based on information related to the at least one subchannel for the PSSCH, information related to at least one slot for the PSSCH, and a source ID of the second device.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
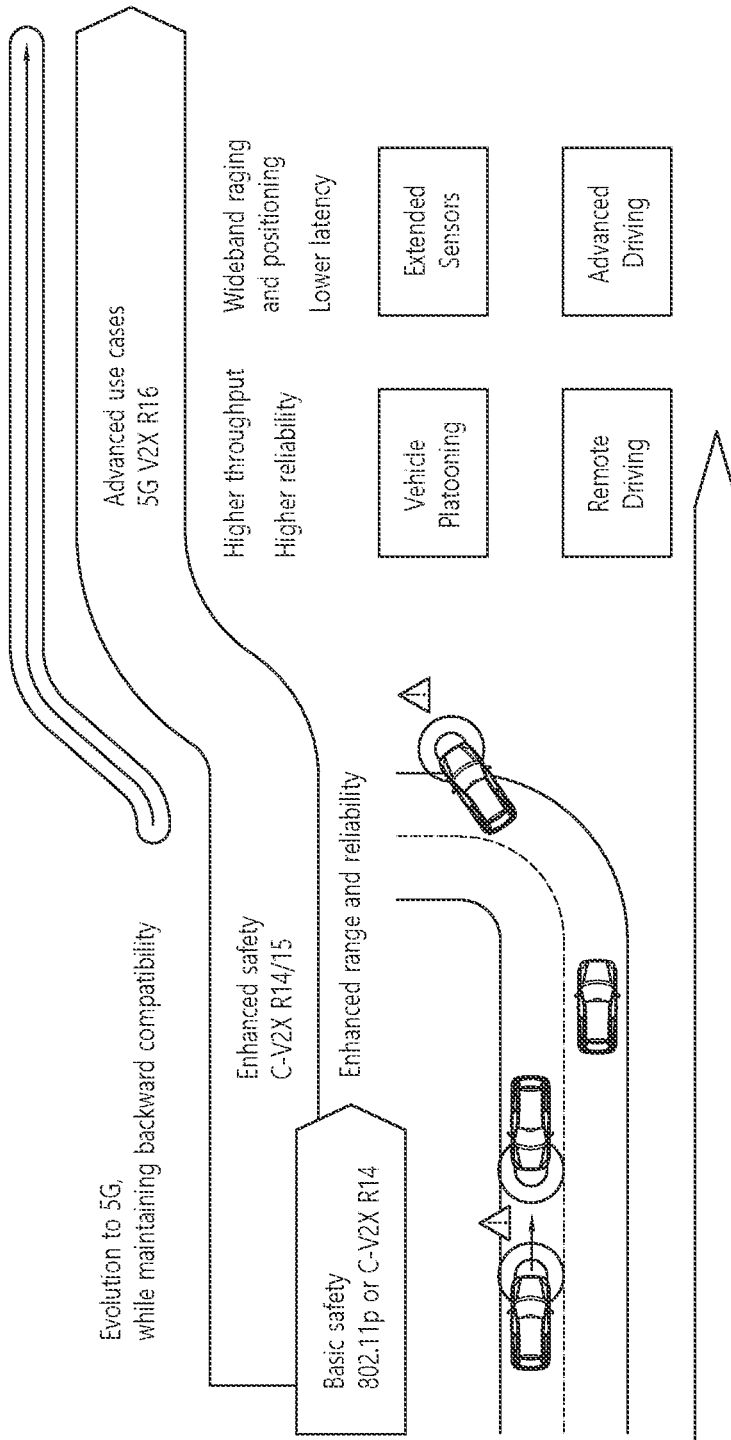
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3G-PP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
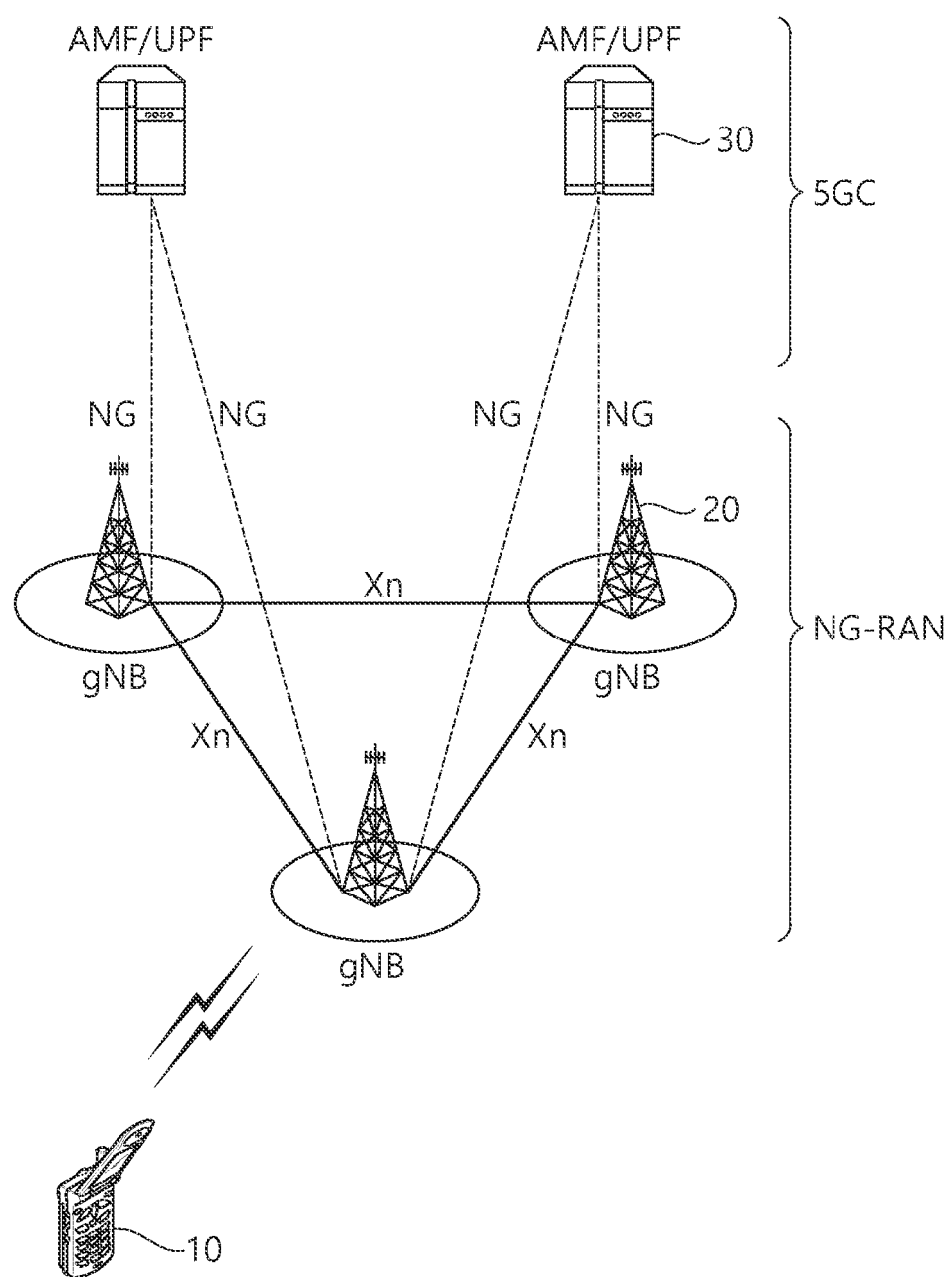
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AME) 30 via NG-C interface, and may be connected to a user plane function (UPF) 30 via NG-U interface.

Figure 3:
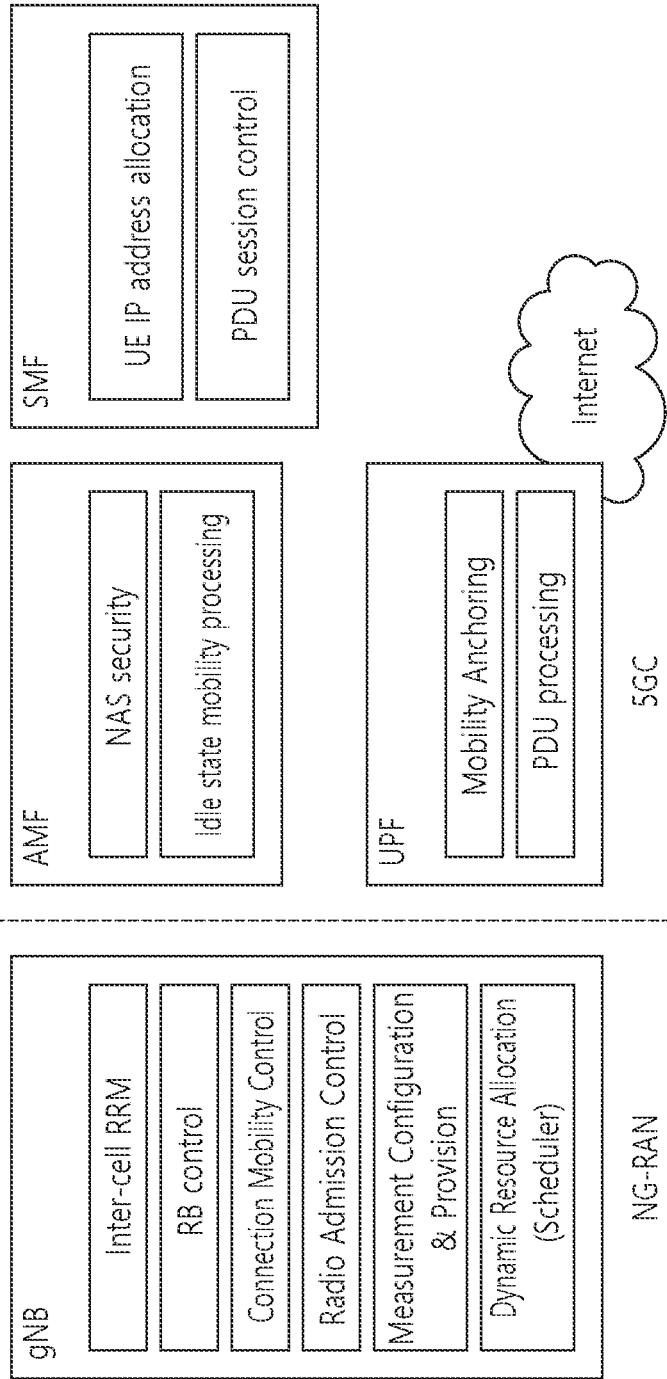
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPI; may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multi cast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
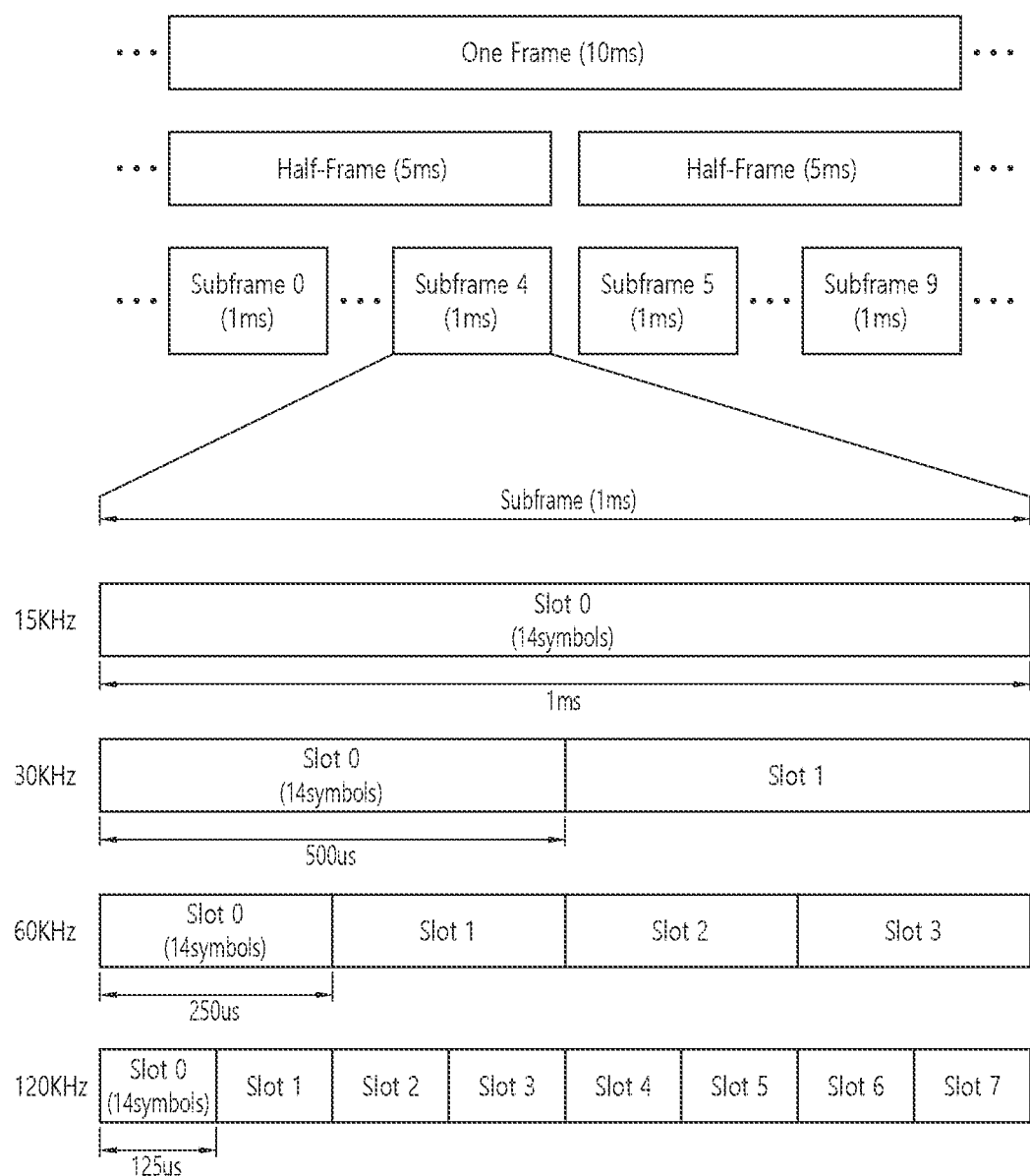
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission, A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframes,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FRI may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
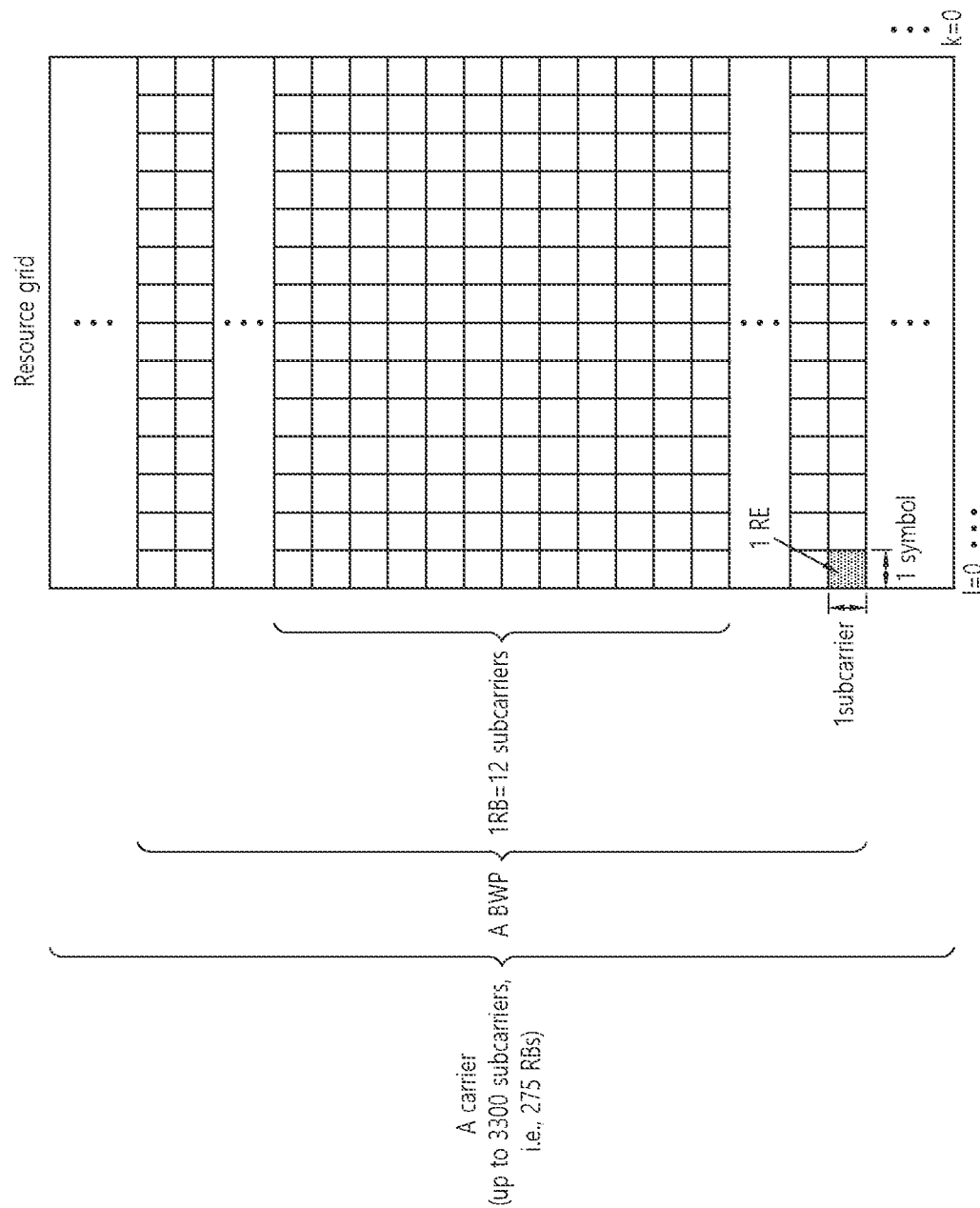
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
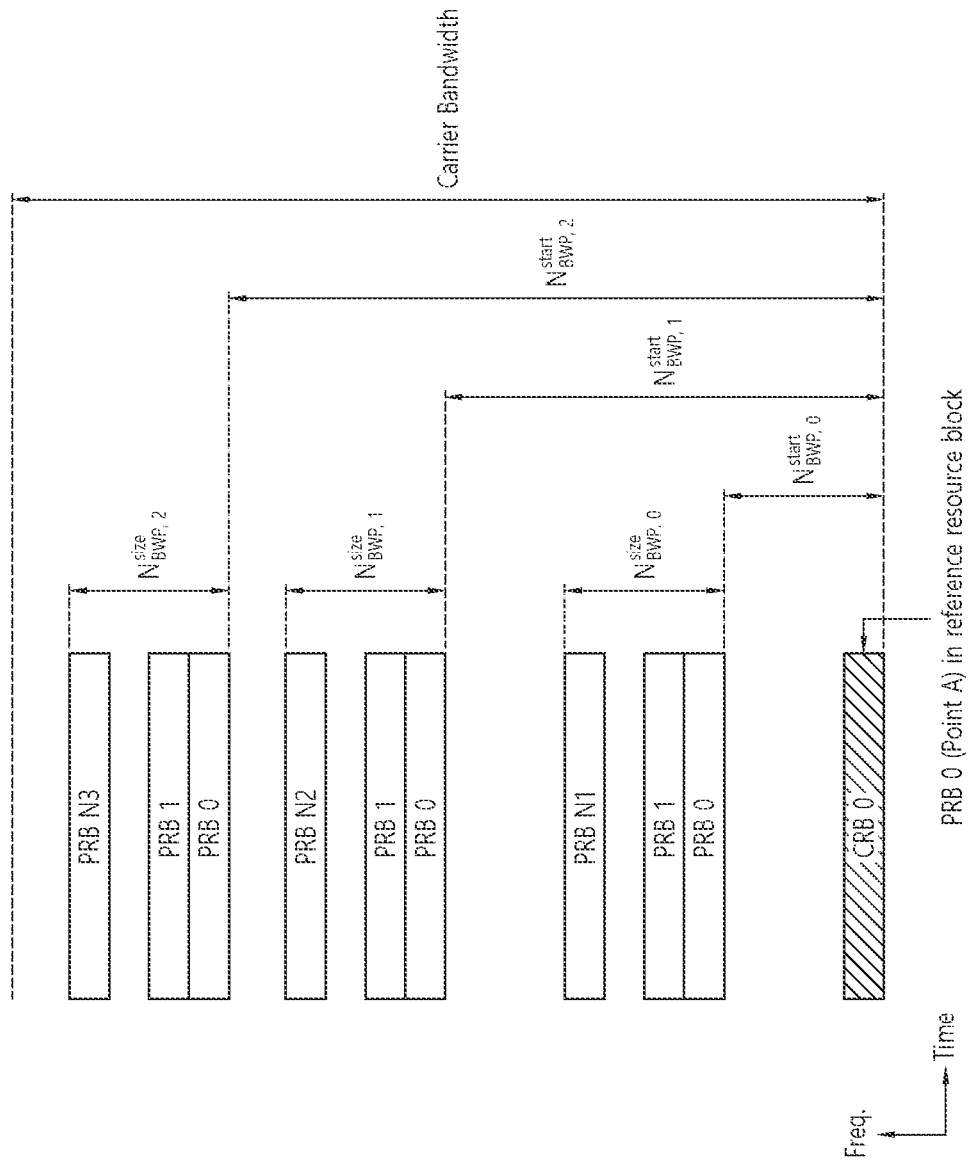
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit bit CRC.

The S-PSS, the S-SSS, and the PSBCH may be included in a block format SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
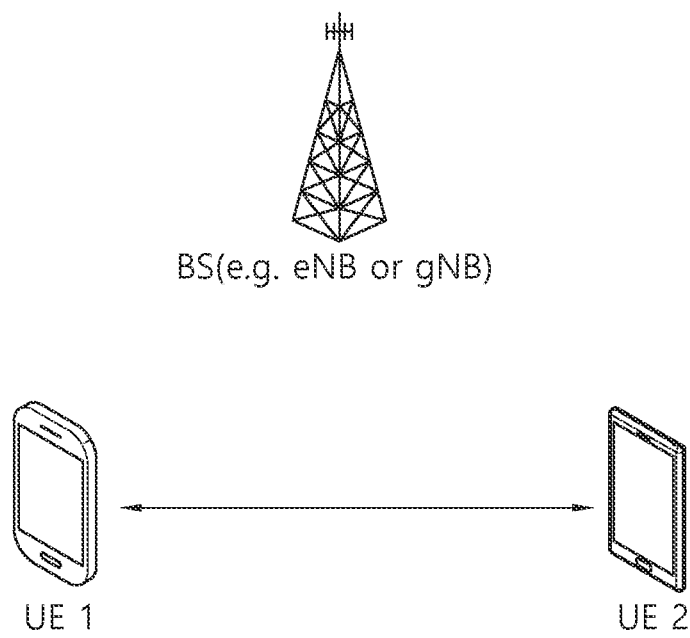
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
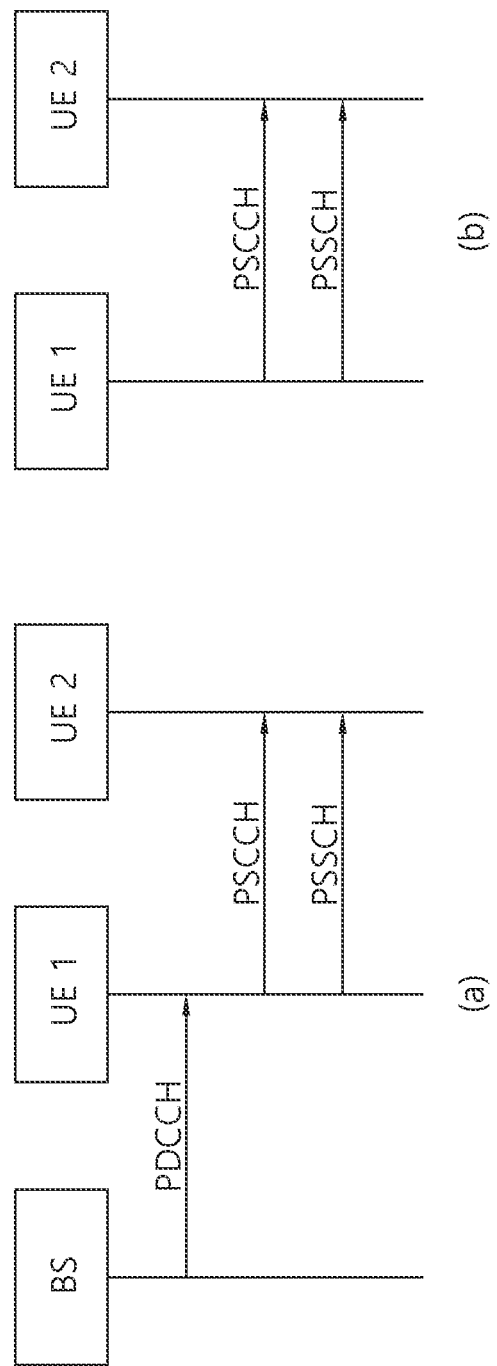
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
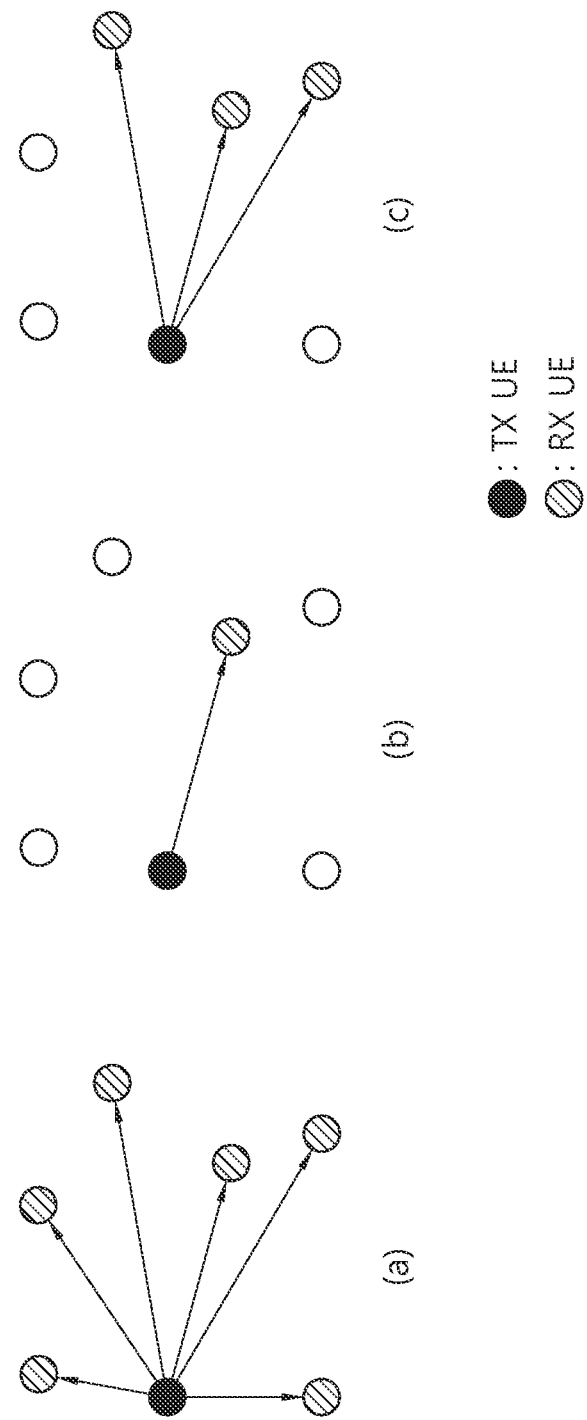
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UTE may receive the PSSCH from a transmitting UE, and the receiving UE may transmit HARQ feedback for the PSSCH to the transmitting UE by using a sidelink feedback control information (SFCI) format through a physical sidelink feedback channel (PSSCH).

For example, the SL, HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SF HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offSet) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSSCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, if the groupcast option 1 is used for sidelink groupcast transmission, a plurality of receiving UEs (e.g., all receiving UEs or some receiving UEs in a group) may share a PSFCH resource to transmit HARQ feedback. On the other hand, if the groupcast option 2 is used for sidelink groupcast transmission, a plurality of receiving UEs (e.g., each receiving UE in a group) may transmit HARQ ACK or HARQ NACK by using separate PSFCH resources. For example, each of PSFCH resources may be mapped to a time domain resource, a frequency domain resource, and a code domain resource.

Meanwhile, all or a part of resources through which a plurality of PSSCHs are transmitted may overlap. For example, resources through which a plurality of PSSCHs are transmitted may completely or partially overlap each other on a frequency domain. For example, resources through which a plurality of PSSCHs are transmitted may completely or partially overlap each other on a time domain. For example, resources through which a plurality of PSSCHs are transmitted may completely or partially overlap each other on a code domain. If all or a part of resources for transmitting a plurality of PSSCHs overlap. PSFCH resources for each PSSCH may need to be distinguished.

Meanwhile, PSSCHs transmitted through different resources may correspond to different transmitting UEs and/or receiving UEs, and PSFCH transmissions corresponding thereto may also occur from different UEs. For example, different transmitting UEs may transmit PSSCHs through different resources, and different transmitting UEs may receive PSFCHs corresponding to the PSSCHs from different UEs. In the above case, in general, transmit power of the PSFCHs may be different. Therefore, if a plurality of PSFCH resources are multiplexed in a code domain (i.e., code-domain multiplexing (CDM)), a problem (hereinafter, a near-far problem) in which the UE cannot detect a specific PSFCH signal may occur due to a large difference in receive power at the PSFCH receiving end. For example, the case in which a plurality of PSFCH resources are multiplexed in the code domain may mean a case in which a plurality of PSFCH resources overlapping in time and frequency resources are transmitted by using different codes.

Figure 12:
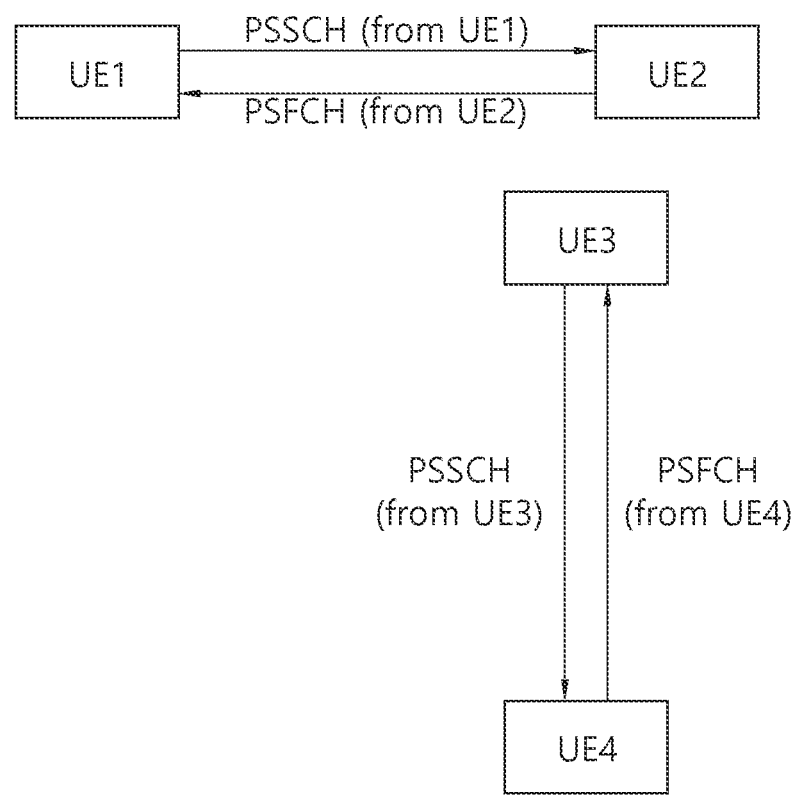
FIG. 12 shows a diagram for explaining a problem in that a UE cannot detect a specific PSFCH signal due to a large difference in receive power at a PSFCH receiving end, based on an embodiment of the present disclosure.

FIG. 12 shows a diagram for explaining a problem in that a UE cannot detect a specific PSFCH signal due to a large difference in receive power at a PSFCH receiving end, based on an embodiment of the present disclosure. The embodiment of FIG. 12 may be combined with various embodiments of the present disclosure.

Referring to FIG. 12, if a PSFCH transmitted by a UE2 to a UE1 and a PSFCH transmitted by a UE4 to a UE3 are CDM, that is, if the PSFCH from the UE2 and the PSFCH from the UE4 are transmitted on overlapping time and frequency resources by using different codes, the UE3 cannot detect the PSFCH transmitted by the UE4 if receive power of the PSFCH transmitted by the UE2 is greater than receive power of the PSFCH transmitted by the UE4 by a certain level in terms of the UE3.

Figure 13:
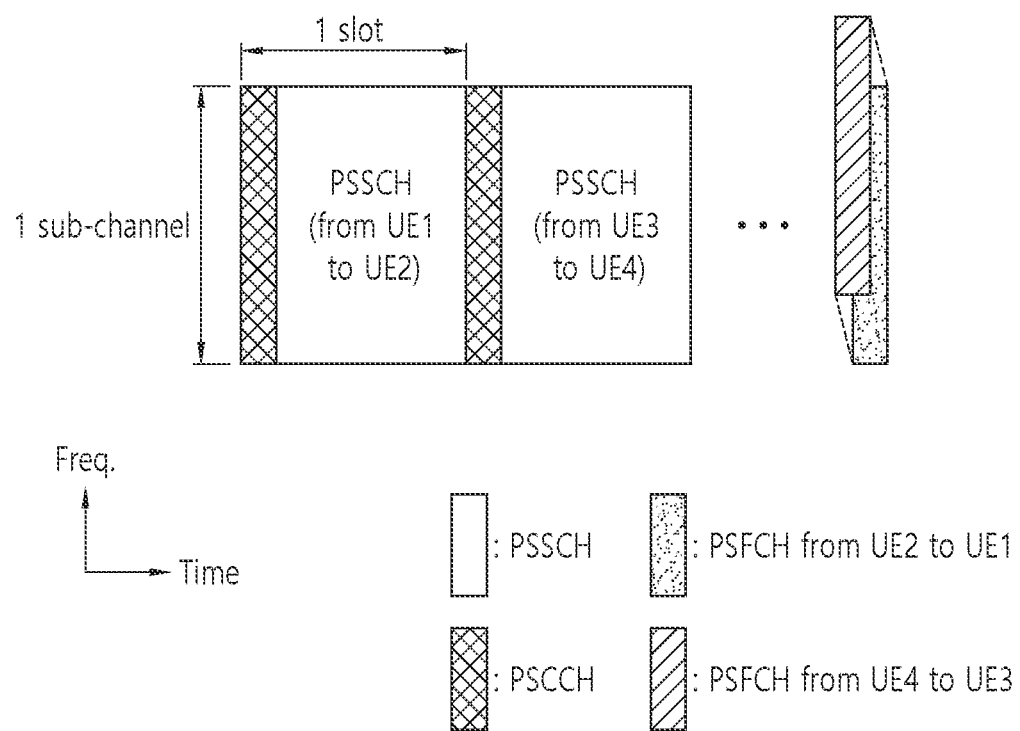
FIG. 13 shows an example in which a plurality of PSFCHs are CDM, based on an embodiment of the present disclosure.

FIG. 13 shows an example in which a plurality of PSFCHs are CDM, based on an embodiment of the present disclosure. The embodiment of FIG. 13 may be combined with various embodiments of the present disclosure.

Referring to FIG. 13, a PSFCH corresponding to a PSSCH transmitted from a UE1 to a UE2 and a PSFCH corresponding to a PSSCH transmitted from a UE3 to a UE4 may be CDM.

Furthermore, if a plurality of PSFCH resources are adjacent on a frequency domain, an interference problem (hereinafter, an inter-band emission (IBE) problem) may occur. IBE may mean that transmit power of signal(s) transmitted by a UE is emitted in a band other than an intended frequency band, thereby reducing reception quality by interfering with other signals being transmitted in a frequency band not used by the UE. For example, if a PSFCH resource #1 and a PSFCH resource #2 are adjacent on a frequency domain, HARQ feedback received through the PSFCH resource #2 and HARQ feedback received through the PSFCH resource #2 by the UE may interfere with each other. Therefore, due to the above IBE problem, the UE may fail to receive HARQ feedback.

Meanwhile, PSFCH resources for PSSCHs transmitted in a plurality of slots may occur in the same slot. In this case, considering latency requirements and performance of the corresponding service, it may be inefficient for a UE to transmit a PSFCH corresponding to a PSSCH transmitted in a slot far in time from a slot in which PSFCH resources exists. For example, if a first UE transmits data for service(s) requiring low latency to a second UE through a specific PSSCH resource, it may be unnecessary for the second UE to transmit a PSFCH to the first UE in a slot far in time from a slot in which the specific PSSCH resource exists. In this case, in order to satisfy latency requirements, the UE receiving the PSSCH may omit transmission of the PSFCH. That is, it may be efficient for the UE to preferentially secure a PSFCH resource corresponding to a resource for a PSSCH transmitted in a slot close in time to a slot in which PSFCH resources exists.

Meanwhile, in the case of groupcast in the next-generation system, a plurality of receiving UE which has received a PSCCH may transmit HARQ feedback for the same PSSCH, respectively. In this case, there may be a plurality of PSFCH resources corresponding to a specific PSSCH, and each of PSFCH resources may be distinguished.

Hereinafter, based on various embodiments of the present disclosure, a method for efficiently managing/determining a PSFCH resource and an apparatus supporting the same are proposed.

Figure 14:
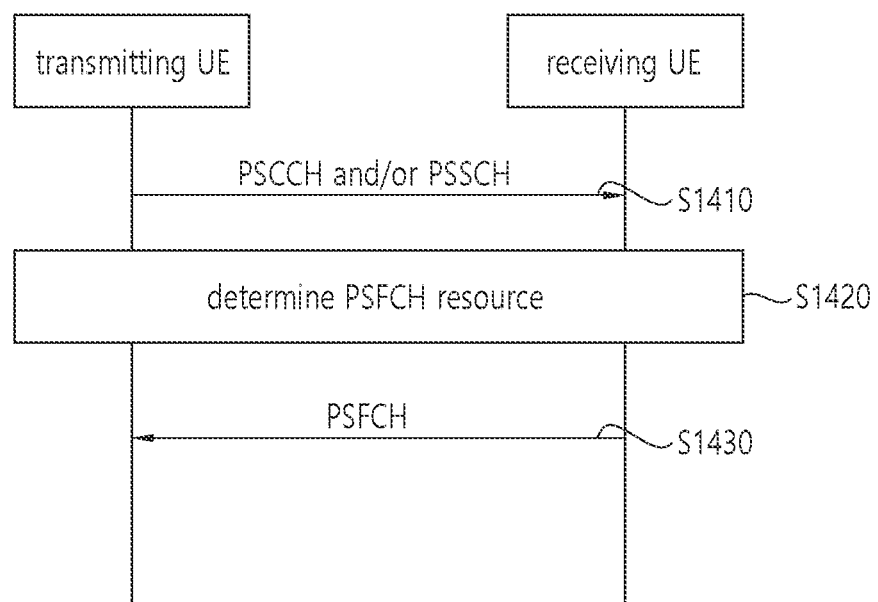
FIG. 14 shows a procedure for a UE to transmit/receive a PSFCH, based on an embodiment of the present disclosure.

FIG. 14 shows a procedure for a UE to transmit/receive a PSFCH, based on an embodiment of the present disclosure. The embodiment of FIG. 14 may be combined with various embodiments of the present disclosure.

Referring to FIG. 14, in step S1410, a transmitting UE may transmit a PSCCH and/or a PSSCH to a receiving UE.

In step S1420, the transmitting UE may determine a PSFCH resource based on the PSCCH and/or the PSSCH. In addition, the receiving UE may determine the PSFCH resource based on the PSCCH and/or the PSSCH. For example, the PSFCH resource may be related to subchannel(s) and a slot for the PSSCH. For example, the transmitting UE and/or the receiving UE may determine the PSFCH resource based on various methods and/or procedures proposed below.

In step S1430, the receiving UE may transmit a PSFCH (e.g., HARQ feedback) on the PSFCH resource. In addition, the transmitting UE may receive the PSFCH (e.g., HARQ feedback) on the PSFCH resource.

Based on an embodiment of the present disclosure, the UE may perform a first grouping for a set of combinations of code domain resources and/or a set of resource blocks (RBs) in which PSFCH resources may exist. In the present disclosure, the set of combinations of code domain resources and/or the set of resource blocks (RBs) in which PSFCH resources may be referred to as a PSFCH resource set. For example, the UE may receive information related to the PSFCH resource set from a base station. For example, the PSFCH resource set may be physical resource(s). Alternatively, for example, the PSFCH resource set may be logical resource(s). If the PSFCH resource set is logical resource(s), the UE may additionally map the logical resource(s) to physical resource(s). In addition, the PSFCH resource set may exist for each PSFCH format. In this case, the UE may perform the first grouping for each PSFCH format. For example, the PSFCH format may include a sequence-based PSFCH format with one symbol, a PSFCH format with N symbols in which a PSFCH format with one symbol is repeated (e.g., N=2), a PSFCH format based on a PUCCH format 2, and/or a PSFCH format spanning all symbols available for sidelink in a slot. In this case, the UE may perform the first grouping for each type of the PSFCH format. Each group by the first grouping may correspond to sub-channel(s) for PSSCH(s). In the present disclosure, a sub-channel may include one or more RBs.

Specifically, for example, each of PSFCH groups by the first grouping may correspond to each of sub-channels that can be used for PSSCH transmission. In the present disclosure, the PSFCH group by the first grouping may be referred to as a first PSFCH resource, a first PSFCH group, or a first PSFCH resource group.

Figure 15:
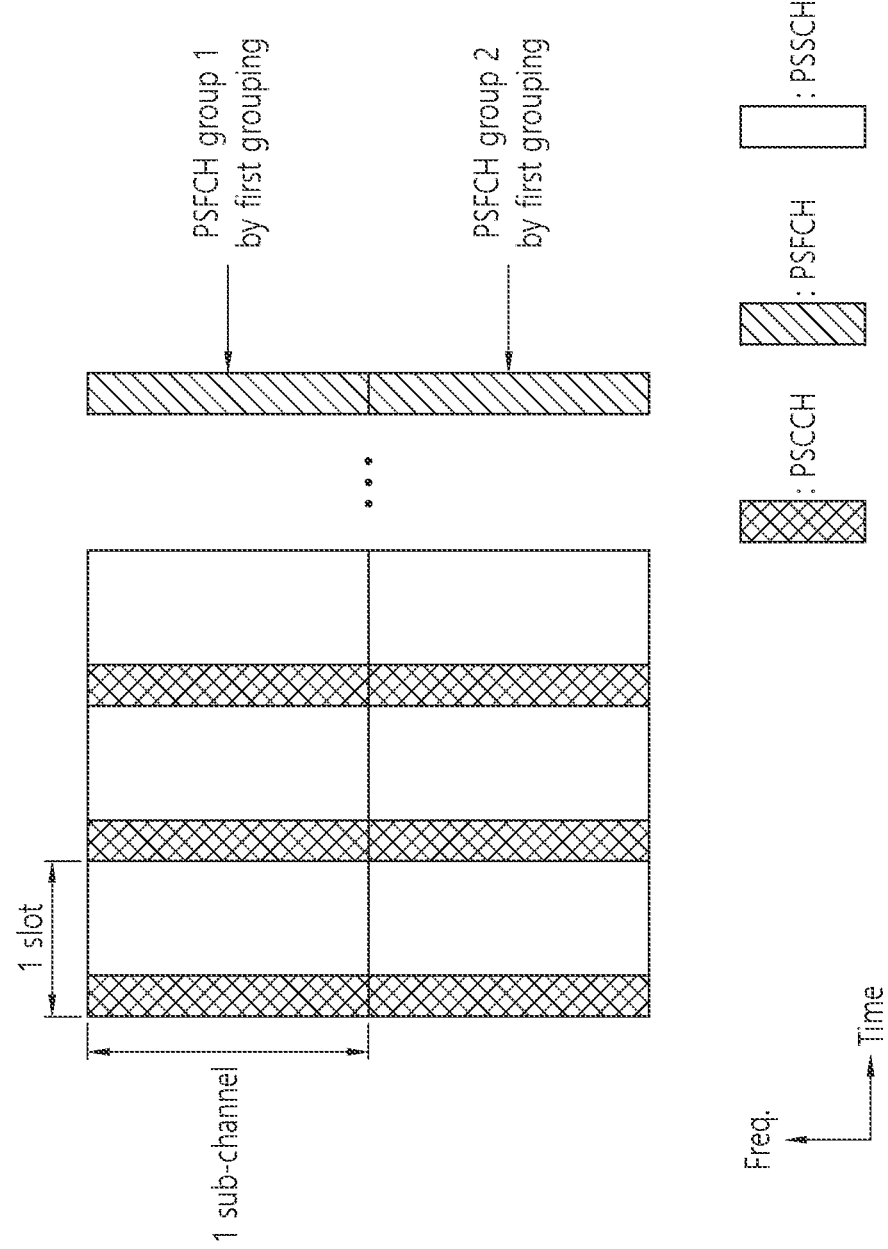
FIG. 15 shows each of PSFCH groups by the first grouping corresponding to each of sub-channels that can be used for PSSCH transmission, based on an embodiment of the present disclosure.

FIG. 15 shows each of PSFCH groups by the first grouping corresponding to each of sub-channels that can be used for PSSCH transmission, based on an embodiment of the present disclosure. The embodiment of FIG. 15 may be combined with various embodiments of the present disclosure.

Referring to FIG. 15, the PSFCH group 1 and the PSFCH group 2 by the first grouping may correspond to one sub-channel, respectively. For example, the PSFCH group 1 by the first grouping may correspond to a first sub-Channel for PSSCH(s), and the PSFCH group 2 by the first grouping may correspond to a second sub-channel for PSSCH(s).

For example, if each of PSFCH groups by the first grouping corresponds to each of sub-channels that can be used for PSSCH transmission, even if a specific sub-channel shares/collides between a plurality of PSSCHs, it is possible to prevent PSFCH resources from colliding. However, if PSSCH transmission consists of a plurality of sub-channels, PSFCH resources may be unnecessarily limited.

Alternatively, each of PSFCH groups by the first grouping may correspond to each of sub-channel groups based on PSSCH allocation. Specifically, for example, if a PSSCH consists of N sub-channels, one PSFCH group may correspond to a bundle of the N sub-channels. Herein, N may be an integer of 2 or more.

Figure 16:
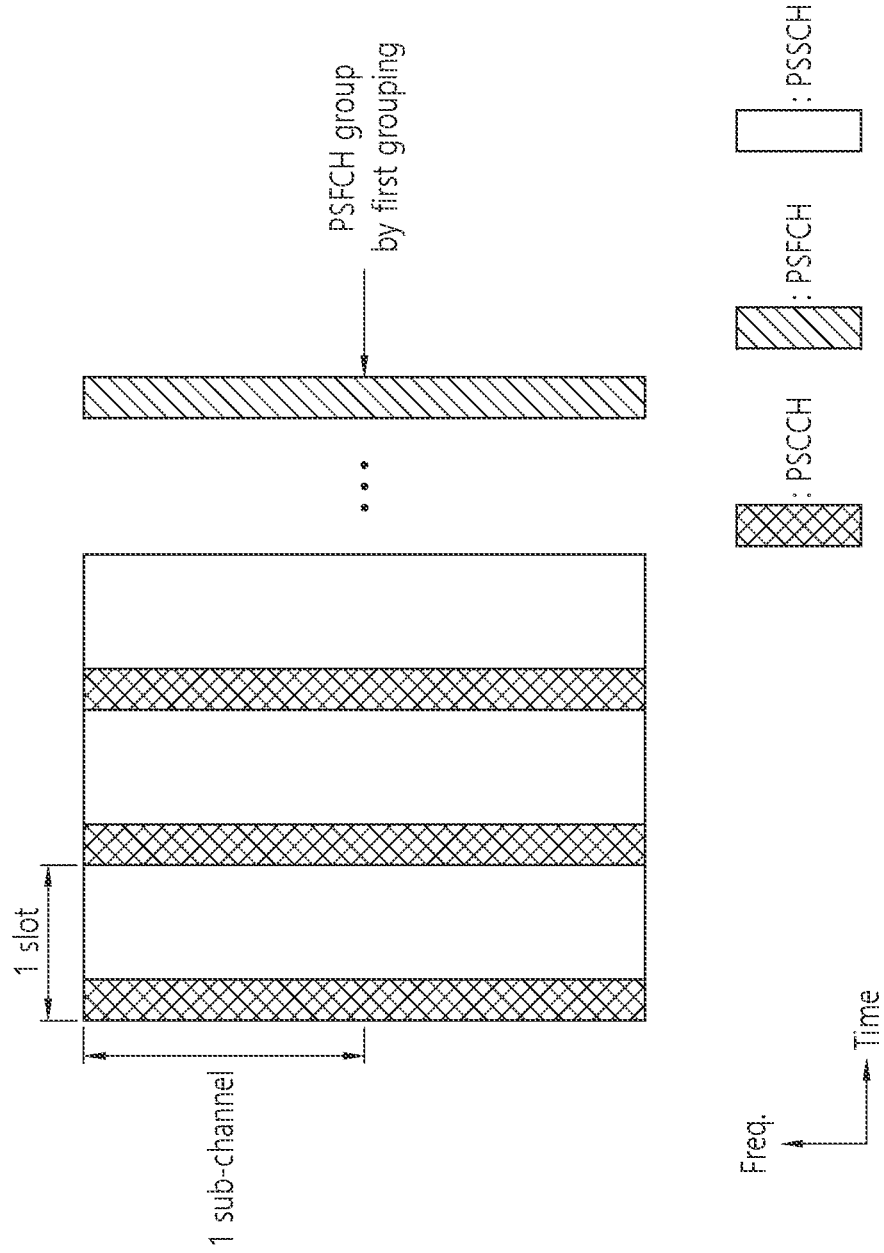
FIG. 16 shows one PSFCH group corresponding to a bundle of N sub-channels, based on an embodiment of the present disclosure.

FIG. 16 shows one PSFCH group corresponding to a bundle of N sub-Channels, based on an embodiment of the present disclosure. The embodiment of FIG. 16 may be combined with various embodiments of the present disclosure.

Referring to FIG. 16, a PSFCH group by the first grouping may correspond to two sub-channels.

For example, if one PSFCH group corresponds to a bundle of a plurality of sub-channels, the PSFCH resource may be more efficiently used in terms of network resource utilization according to resource allocation for PSSCH(s). However, if a specific sub-channel is shared/collided between a plurality of PSSCHs, a method for preventing PSFCH resources from colliding may be additionally required.

Additionally, based on an embodiment of the present disclosure, the UE may perform a second grouping for each of PSFCH groups by the first grouping. With respect to a specific PSFCH group by the first grouping (hereinafter, level 1-group), each of PSFCH groups by the second grouping (hereinafter, level 2-group) may correspond to each of PSSCH transmission slots. In the present disclosure, the PSFCH group by the second grouping may be referred to as a second PSFCH resource, a second PSFCH group, or a second PSFCH resource group.

Specifically, for example, it may correspond to the level 2-group from the late slot in time in a HARQ-related set, and mapping to PSFCH groups may be performed in such a way that interval(s) between level 2-groups is maximized. In the present disclosure, the HARQ-related set may be a set of slots related to PSCCHs and/or PSSCHs in which PSFCHs can be transmitted in the same slot. For example, as in the Greedy algorithm method (i.e., an algorithm that selects the best resource according to a predetermined criterion), whenever a slot in the HARQ-related set is additionally considered, mapping between level 2-groups and slots may be performed in such a way that (RB) interval(s) between PSFCH resources or the selected/determined level 2-groups is maximized.

Figure 17:
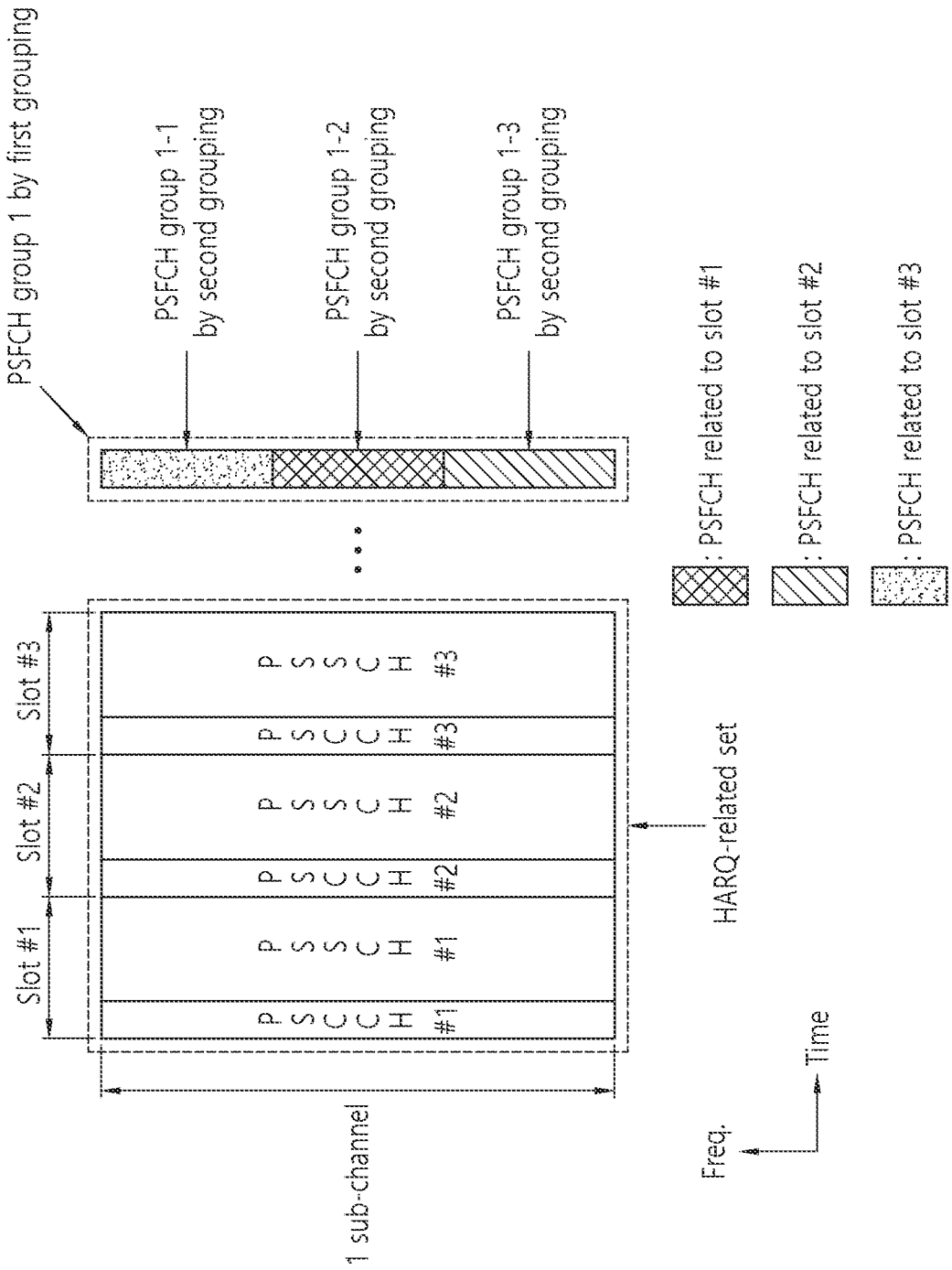
FIG. 17 shows an example of the second grouping in the case of each of PSFCH groups by the first grouping corresponding to each of sub-channels, based on an embodiment of the present disclosure.

FIG. 17 shows an example of the second grouping in the case of each of PSFCH groups by the first grouping corresponding to each of sub-channels, based on an embodiment of the present disclosure. The embodiment of FIG. 17 may be combined with various embodiments of the present disclosure.

Referring to FIG. 17, the PSFCH group 1 by the first grouping may be divided into the PSFCH group 1-1, the PSFCH group 1-2, and the PSFCH group 1-3 by the second grouping. In addition, PSFCH resource(s) related to the third slot in the HARQ-related set may be the PSFCH group 1-1, and PSFCH resource(s) related to the second slot in the HARQ-related set may be the PSFCH group 1-3, and PSFCH resource(s) related to the first slot in the HARQ-related set may be the PSFCH group 1-2. Accordingly, the UE may receive HARQ feedback related to the PSSCH #1 through the PSFCH group 1-2, and the UE may receive HARQ feedback related to the PSSCH #2 through the PSFCH group 1-3, and the UE may receive HARQ feedback related to the PSSCH #3 through the PSFCH group 1-1.

Figure 18:
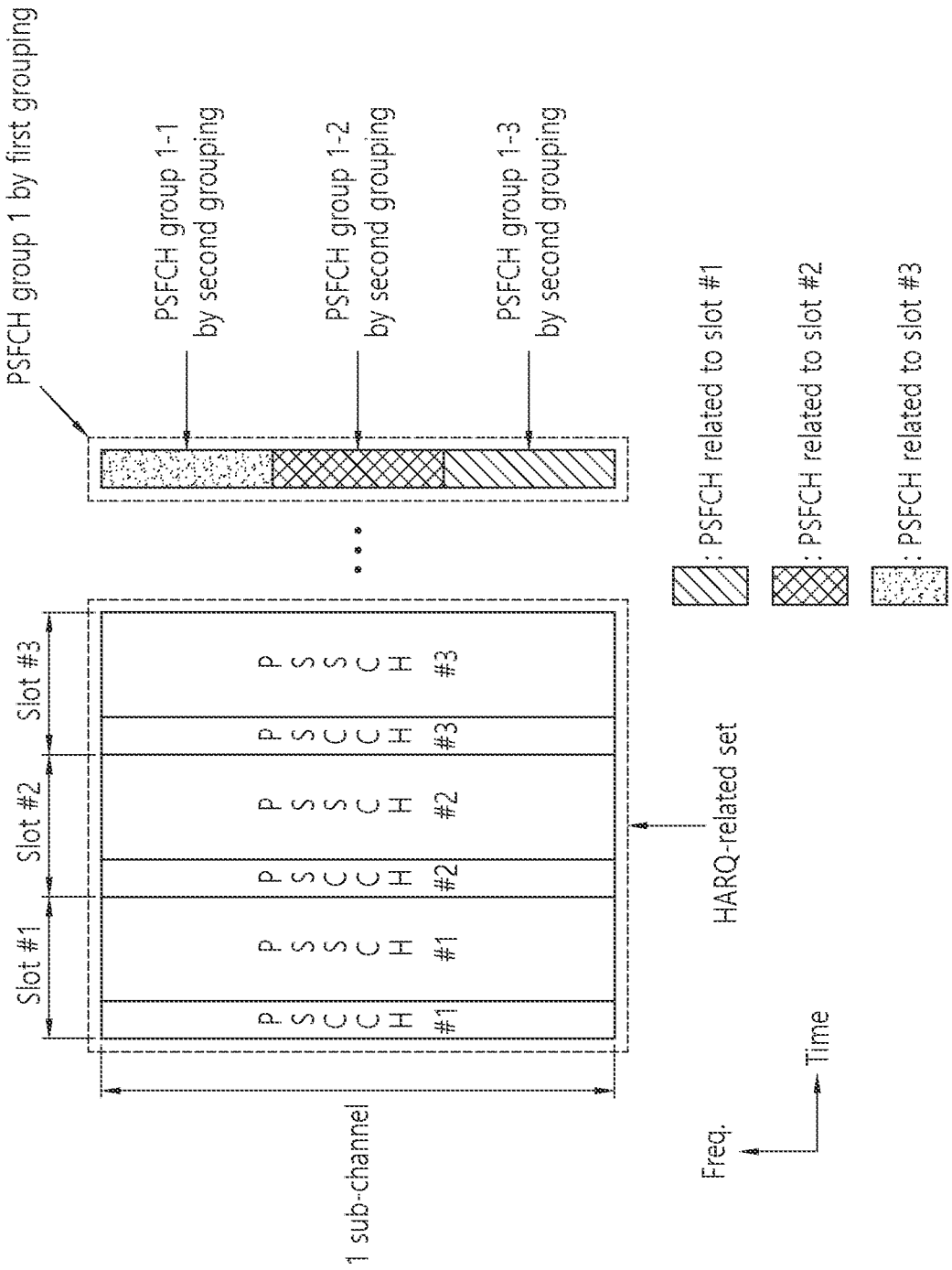
FIG. 18 shows an example of the second grouping in the case of each of PSFCH groups by the first grouping corresponding to each of sub-channels, based on an embodiment of the present disclosure.

FIG. 18 shows an example of the second grouping in the case of each of PSFCH groups by the first grouping corresponding to each of sub-channels, based on an embodiment of the present disclosure. The embodiment of FIG. 18 may be combined with various embodiments of the present disclosure.

Referring to FIG. 18, the PSFCH group 1 by the first grouping may be divided into the PSFCH group 1-1, the PSFCH group 1-2, and the PSFCH group 1-3 by the second grouping. In addition, PSFCH resource(s) related to the third slot in the HARQ-related set may be the PSFCH group 1-1, and PSFCH resource(s) related to the second slot in the HARQ-related set may be the PSFCH group 1-2, and PSFCH resource(s) related to the first slot in the HARQ-related set may be the PSFCH group 1-3. Accordingly, the UE may receive HARQ feedback related to the PSSCH #1 through the PSFCH group 1-3, and the UE may receive HARQ feedback related to the PSSCH #2 through the PSFCH group 1-2, and the UE may receive HARQ feedback related to the PSSCH #3 through the PSFCH group 1-1.

Figure 19:
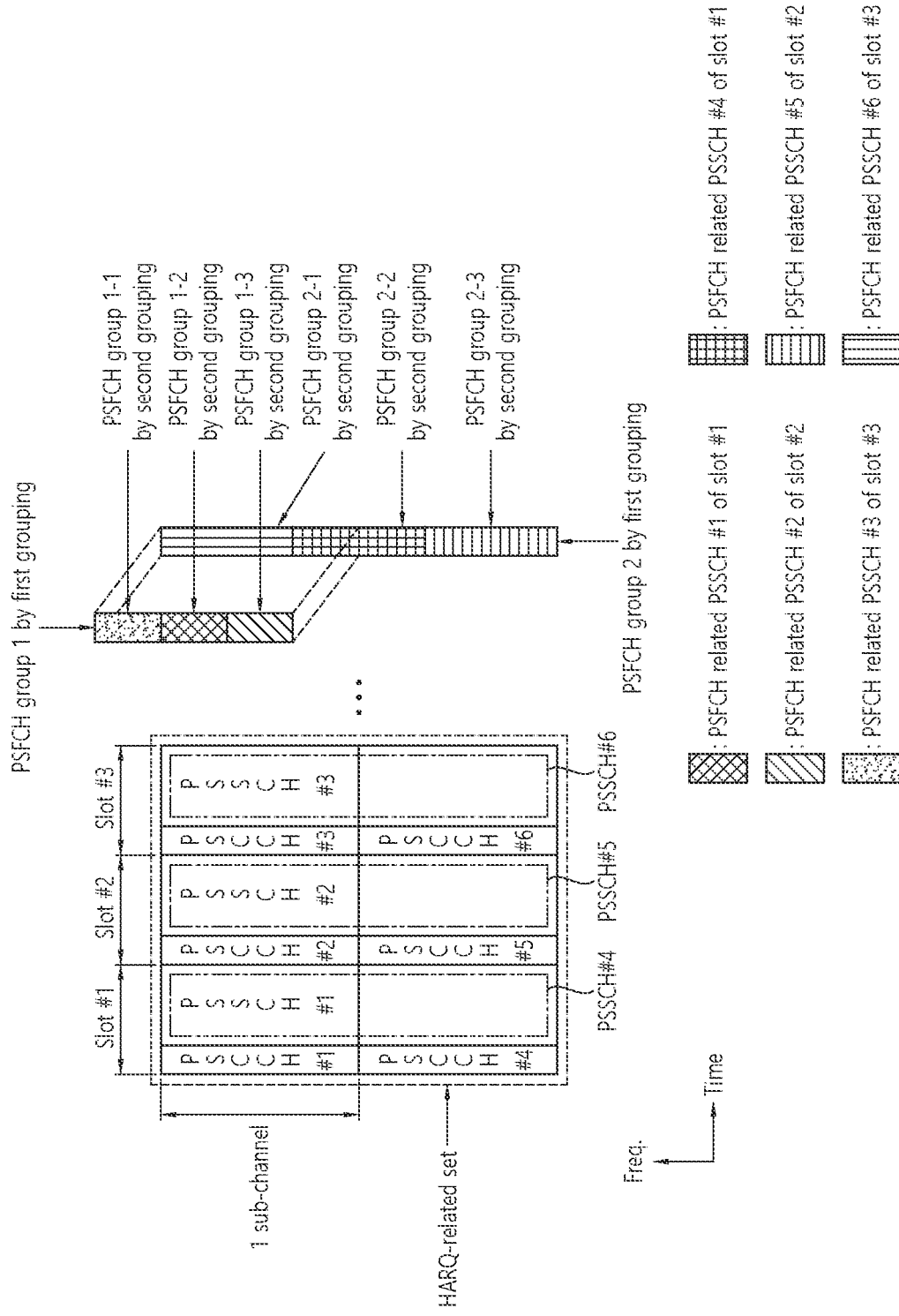
FIG. 19 shows an example of the second grouping in the case of PSFCH groups by the first grouping corresponding to a plurality of sub-channels, based on an embodiment of the present disclosure.

FIG. 19 shows an example of the second grouping in the case of PSFCH groups by the first grouping corresponding to a plurality of sub-channels, based on an embodiment of the present disclosure. The embodiment of FIG. 19 may be combined with various embodiments of the present disclosure.

Referring to FIG. 19, it is assumed that UE(s) transmits the PSSCH #1 to the PSSCH #3 through one sub-channel and UE(s) transmits the PSSCH #4 to the PSSCH #6 through two sub-channels. In this case, the PSFCH group 1 related to the PSSCH #1 to the PSSCH #3 and the PSFCH group 2 related to the PSSCH #4 to the PSSCH #6 may overlap in time and frequency. In addition, the PSFCH group 1 by the first grouping may be divided into the PSFCH group 1-1, the PSFCH group 1-2, and the PSFCH group 1-3 by the second grouping, and the PSFCH group 2 by the first grouping may be divided into the PSFCH group 2-1, the PSFCH group 2-2, and the PSFCH group 2-3 by the second grouping.

The PSFCH group 1-1 may be PSFCH resource(s) related to the PSSCH #3 of the slot #3, and the PSFCH group 1-2 may be PSFCH resource(s) related to the PSSCH #1 of the slot #1, and the PSFCH group 1-3 may be PSFCH resource(s) related to the PSSCH #2 of the slot #2. The PSFCH group 2-1 may be PSFCH resource(s) related to the PSSCH #6 in the slot #3, and the PSFCH group 2-2 may be PSFCH resource(s) related to the PSSCH #4 in the slot #1, and the PSFCH group 2-3 may be PSFCH resource(s) related to the PSSCH #5 in the slot #2. Accordingly, the UE(s) may receive HARQ feedback related to the PSSCH #1 through the PSFCH group 1-2, and the UE(s) may receive HARQ feedback related to the PSSCH through the PSFCH group 1-3, and the UE(s) may receive HARQ feedback related to the PSSCH #3 through the PSFCH group 1-1. In addition, the UE(s) may receive HARQ feedback related, to the PSSCH #4 through the PSFCH group 2-2, and the UE(s) may receive HARQ feedback related to the PSSCH #5 through the PSFCH group 2-3, and the UE(s) may receive HARQ feedback related to the PSSCH #6 through the PSFCH group 2-1.

Unlike the embodiment of FIG. 17 or FIG. 18, in the embodiment of FIG. 19, a plurality of PSSCHs transmitted by the UE(s) may overlap in (resource) regions partially or fully. Therefore, for example, if a UE receives HARQ feedback through the PSFCH group 1-1, the UE needs to distinguish/determine whether the HARQ feedback is HARQ feedback related to the PSSCH #3 or HARQ feedback related to the PSSCH #6. Alternatively, for example, if a UE receives HARQ feedback through the PSFCH group 1-2, the OF needs to distinguish/determine whether the HARQ feedback is HARQ feedback related to the PSSCH #1 or HARQ feedback related to the PSSCH #6. The above problem can be solved through a third grouping, Which will be described later.

Based on the proposed method(s), in the case of PSSCH(s) and/or PSCCH(s) transmitted in fast slot(s) in time in a HARQ-related set, the UE may omit HARQ feedback based on latency requirements of sidelink service(s). In this case, frequency domain interval(s) between PSFCH resources used actually may be maximized. Thus, the IBE problem can be alleviated. For example, if transmission of HARQ feedback for the PSSCH #1 is omitted in the embodiment of FIG. 17, IBE between HARQ feedback received through the PSFCH group 1-1 and HARQ feedback received through the PSFCH group 1-3 by a UE may be minimized.

Based on an embodiment of the present disclosure, a set of RBs for PSFCH resource(s) (i.e., the PSFCH resource set) may be (pre-)configured for the UE differently for each resource pool, or may be (pre-)configured for the UE, independently for each resource pool. That is, the UE may receive configuration information related to the set of RBs for PSFCH resource(s) corresponding to each of a plurality of resource pools, from a base station/network. For example, the size of each of PSFCH groups by the first grouping may be the same. For example, the size of each of PSFCH groups by the first grouping may be different from each other. For example, the size of each of PSFCH groups by the second grouping may be the same. For example, the size of each of PSFCH groups by the second grouping may be different from each other.

For example, if the number of RBs included in the set of RBs for PSFCH resource(s) is a multiple of the number of sub-channels in a resource pool and a multiple of a value related to a period of PSFCH resource(s) (or the number of PSSCH slots associated with the same PSFCH slot), the size of each of PSFCH groups by the first grouping may be the same. For example, if (i) the number of RBs included in the set of RBs for PSFCH resource(s) is a multiple of the number of sub-channels in a resource pool, and (ii) the number of RBs included in the set of RBs for PSFCH resource(s) is a multiple of a value related to a period of PSFCH resource(s) (or the number of PSSCH slots associated with the same PSFCH slot), the size of each of PSFCH groups by the second grouping may be the same. Specifically, for example, if (i) the number of RBs included in the set of RBs for PSFCH resource(s) is a multiple of the number of sub-channels in a resource pool, and (ii) the number of RBs included in the set of RBs for PSFCH resource(s) is a multiple of a value related to a period of PSFCH resource(s) (or the number of PSSCH slots associated with the same PSFCH slot), the size of each of PSFCH groups by the second grouping may be set/determined by dividing the number of RBs included in the set of RBs for PSFCH resource(s) by a value which is obtained by multiplying the number of sub-channels in the resource pool by the value related to the period of PSFCH resource(s). That is, if (i) the number of RBs included in the set of RBs for PSFCH resource(s) is a multiple of the number of sub-channels in a resource pool, and (ii) the number of RBs included in the set of RBs for PSFCH resource(s) is a multiple of a value related to a period of PSFCH resource(s) (or the number of PSSCH slots associated with the same PSFCH slot), the size of each of PSFCH groups by the second grouping may be set/determined based on Equation 1. For example, the size of the PSFCH group by the second grouping may be the number of RBs included in the second PSFCH resource.

[Equation 1]

$$\text{The size of a } PSFCH \text{ group by the second grouping} = \frac{\text{The number of } RBs \text{ included in a set of } RBs \text{ for } PSFCH \text{ resource(s)}}{\text{The number of subchannels in a resource pool} \times \text{A value related to a period of } PSFCH \text{ resource(s)}}$$

For example, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the UE may maintain the size of each of PSFCH groups by the first grouping equally, and the UE may not use some RB(s) in the set of RBs for PSFCH resource(s). For example, the RB(s) not used as PSFCH resource(s) may be RB(s) with high RB index(es) among RBs included in the set of RBs for PSFCH resource(s). For example, the RB(s) not used as PSFCH resource(s) may be K RBs with high RB index(es) among RBs included in the set of RBs for PSFCH resource(s). For example, K may be a positive integer. For example, the RB(s) not used as PSFCH resource(s) may be RB(s) with low RB index(es) among RBs included in the set of RBs for PSFCH resource(s). For example, the RB(s) not used as PSFCH resource(s) may be L RBs with low RB index(es) among RBs included in the set of RBs for PSFCH resource(s). For example, L may be a positive integer.

For example, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the size of each of PSFCH groups by the first grouping may be determined/set differently.

For example, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the UE may maintain the size of each of PSFCH groups by the second grouping equally, and the UE may not use some RB(s) in the set of RBs for PSFCH resource(s). For example, the RB(s) not used as PSFCH resource(s) may be distributed in each of PSFCH resource groups by the first grouping. For example, after the second grouping, the UE may not use one or more RBs with high RB index(es) among RBs in each of PSFCH resource groups by the first grouping as PSFCH resource(s). For example, after the second grouping, the UE may not use one or more RBs with low RB index(es) among RBs in each of PSFCH resource groups by the first grouping as PSFCH resource(s).

For example, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the size of each of PSFCH groups by the second grouping may be determined/set differently. Specifically, for example, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the size of each of PSFCH groups by the second grouping may be set/determined by rounding up a value which is obtained by dividing the number of RBs included in the set of RBs for PSFCH resource(s) by a value which is obtained by multiplying the number of sub-channels in the resource pool by the value related to the period of PSFCH resource(s). That is, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the size of each of PSFCH groups by the second grouping may be se/determined based on Equation 2.

$$[\text{Equation 2}]$$

The size of a *PSFCH* group by the second grouping =

$$\left[ \frac{\text{The number of } RBs \text{ included in a set of } RBs \text{ for } PSFCH \text{ resource(s)}}{\text{The number of subchannels in a resource pool} \times \text{A value related to a period of } PSFCH \text{ resource(s)}} \right]$$

For example, if the number of RBs included in the set of RBs related to PSFCH resource(s) is not a multiple of at least one of the number of sub-channels in a resource pool and/or a value related to a period of PSFCH resource(s) (or the number of PSFCH slots associated with the same PSFCH slot), the size of each of PSFCH groups by the second grouping may be set/determined by rounding down a value which is obtained by dividing the number of RBs included in the set of RBs for PSFCH resource(s) by a value which is obtained by multiplying the number of sub-channels in the resource pool by the value related to the period of PSFCH resource(s). That is, if the number of RBs included in the set of RBs related to PSFCH resource(s) is not a multiple of at least one of the number of sub-channels in a resource pool and/or a value related to a period of PSFCH resource(s) (or the number of PSSCH slots associated with the same PSFCH slot), the size of each of PSFCH groups by the second grouping may be set/determined based on Equation 3.

$$[\text{Equation 3}]$$

The size of a *PSFCH* group by the second grouping =

$$\left\lfloor \frac{\text{The number of } RBs \text{ included in a set of } RBs \text{ for } PSFCH \text{ resource(s)}}{\text{The number of subchannels in a resource pool} \times \text{A value related to a period of } PSFCH \text{ resource(s)}} \right\rfloor$$

For example, if the size of each of PSFCH groups by the second grouping is determined by Equation 2 or Equation 3, the UE may set/determine the size of each of PSFCH groups by the first grouping or the size of each of PSFCH groups by the second grouping to be the same as possible (i.e., so that the size difference of each of PSFCH groups is 1 or less).

For example, if the size of each of PSFCH groups by the second grouping is different, PSFCH groups having a relatively large size may belong to the same PSFCH group by the first grouping. In this case, a relatively large number of PSFCH candidate resources may be allocated to PSFCH group(s) corresponding to the first subchannel in a resource pool. For example, if the size of each of PSFCH groups by the second grouping is different, PSFCH groups having a relatively large size may belong to different PSFCH groups by the first grouping. Specifically, for example, PSFCH groups having a relatively large size may be distributed to each of PSFCH groups by the first grouping. For example, a relatively large number of PSFCH candidate resources may be allocated to PSFCH group(s) corresponding to fast slot(s) in a time domain. For example, a relatively large number of PSFCH candidate resources may be allocated to PSFCH group(s) corresponding to late slot(s) in a time domain.

Additionally, based on an embodiment of the present disclosure, the UE may perform a third grouping for each of PSFCH groups by the second grouping (i.e., level 2-groups). In the present disclosure, the PSFCH group by the third grouping may be referred to as a third PSFCH resource, a third PSFCH group, or a third PSFCH resource group. If PSFCH resources related to a plurality of PSSCHs overlap as in the embodiment of FIG. 19, the UE may perform the third grouping in order to distinguish/determine a PSSCH to which HARQ feedback received on the same PSFCH resource is related.

For a specific level 2-group within a specific level 1-group, PSFCH groups by the third grouping (hereinafter, level 3-groups) may correspond to parameter(s) for discriminating PSSCHs sharing all or some sub-channels. For example, the UE which transmits a PSSCH may perform the third grouping for a specific level 2-group, by using a demodulation reference signal (DMRS) sequence for the PSSCH and/or a PSCCH corresponding to the PSSCH or parameter(s) used to generate the DMRS sequence. For example, the UE which transmits a PSSCH may perform the third grouping for a specific level 2-group, by using information on sub-channel(s) to which a PSCCH corresponding to the PSSCH is mapped. For example, the UE which transmits a PSSCH may perform the third grouping for a specific level 2-group, by using resource allocation information for the PSSCH. Alternatively, for example, the UE which transmits a PSSCH and/or a PSCCH may perform the third grouping for a specific level 2-group, by using all or a part of an L1-source ID transmitted/indicated through a SCI. Specifically, for example, the UE which transmits a PSSCH and/or a PSCCH may perform the third grouping for a specific level 2-group by using Equation 4.

L1 source ID mod X

Herein, "Y=A mod B" may be a function deriving a remainder obtained by dividing A by B.

Specifically, for example, the value of X may be pre-defined for the UE. For example, the value of X may be configured or pre-configured for the UE for each resource pool. For example, the value of X may be configured or pre-configured for the UE for each PSFCH resource set. In the present disclosure, the operation configured for the UE may include the operation of a base station/network transmitting configuration related information to the UE.

For example, the parameter may be inferred/obtained from the demodulation reference signal (DMRS) sequence for the PSSCH and/or the PSCCH corresponding to the PSSCH or parameter(s) used to generate the DMRS sequence. For example, PSCCHs transmitted by different UEs may collide in the same resource. In this case, if the DMRS sequence or parameter(s) used to generate the DMRS sequence are different, receiving UE(s) may distinguish PSCCHs transmitted by different UEs in the same resource. Accordingly, the DMRS sequence or parameter(s) used to generate the DMRS sequence may be used to distinguish PSFCH resources associated with a plurality of PSSCHs sharing all or a part of resources.

Additionally/alternatively, for example, the parameter may be inferred/obtained from sub-channel(s) to which a PSCCH corresponding to the PSSCH is mapped. Even if a part of sub-channels overlaps between a plurality of PSSCH resources, PSCCH resources may be different from each other. Accordingly, based on sub-channel(s) to which the PSCCH corresponding to the PSSCH is mapped, collision between PSSCHs corresponding to PSSCHs in which all or a part of resources are shared can be prevented.

Additionally/alternatively, for example, the parameter may be inferred/obtained from resource allocation information for the PSSCH. For example, the resource allocation information for the PSSCH may include a starting sub-channel and/or the number of sub-channels, etc. In this case, in the case of collision between PSSCHs having the same starting sub-channel but different number of sub-channels, PSFCH resources corresponding to different PSSCHs may be distinguished. Alternatively, if starting sub-Channels collide between different PSSCHs, PSFCH resources corresponding to different PSSCHs may be distinguished. However, the number of resource allocation information for the PSSCH may be large according to a combination thereof. Therefore, it may be difficult for the UE to secure PSFCH resources.

Additionally, based on an embodiment of the present disclosure, a specific PSFCH resource in the level 3-group may be inferred/obtained from information on a receiving UE and/or PSFCH transmission. For example, a transmitting UE and/or a receiving UE may determine a specific PSFCH resource in the level 3-group based on the information on the receiving UE and/or PSFCH transmission. Specifically, for example, in the case of the HARQ feedback mode of a specific groupcast, a plurality of receiving UEs which have received the same PSSCH from a transmitting LE may transmit HARQ feedback to the transmitting UE by using each of allocated PSFCH resources, respectively. That is, for the same PSFCH resource, the PSFCH resource may be divided based on at least information on a UE transmitting HARQ feedback (or a UE receiving the PSSCH). Specifically, for example, the information on the UE receiving the PSSCH may be information provided from a higher layer. For example, the information provided from the higher layer may be identification information (e.g., ID, hereinafter, receiving UE identification information) assigned to each receiving UE in order to distinguish receiving UEs within the same group in the groupcast. Alternatively, for example, the transmitting UE may infer/obtain the information on the UE receiving the PSSCH from a source ID of the UE receiving the PSSCH.

In the next-generation system, when a plurality of UEs receiving a PSSCH in a groupcast transmit HARQ feedback for the PSSCH, the plurality of UEs may perform power control for PSFCHs. In the above case, in terms of a UE receiving PSFCHs (i.e., in terms of a UE transmitting the PSSCH), the difference in PSFCH receive power may not be large. In the above situation, the IBE problem and/or the Near-Far problem between PSFCH reception may be alleviated. Therefore, the performance degradation due to disposing PSFCH resources in adjacent RBs or performing CDM in the same RB may be insignificant. For example, if an RB index derived/determined from an L1-source ID of a receiving UE is Y, the receiving UE may select/determine an RB with an RB index (Y+M) mod Z in the third group as an RB for PSFCH transmission. In this case, M may be a value related to identification information allocated to the receiving UE, and Z may be a value of the number of RBs included in the third group.

Meanwhile, if a plurality of PSFCH resources related to each of different L1-source IDs in the same RB overlap each other, in order to distinguish them, a receiving UE may change/determine a cyclic shift value used to generate each PSFCH sequence to/as an L1-source ID. Additionally/alternatively, for example, if a plurality of PSFCH resources related to each different receiving UE identification information in the same RB overlap each other, in order to distinguish them, a receiving UE may change/determine a cyclic shift value used to generate each PSFCH sequence to/as receiving UE identification information. Specifically, for example, if a plurality of PSFCH resources related to each different receiving UE identification information in the same RB overlap each other, the receiving UE may increase a cyclic shift index by a multiple of Z, by using a group identification information value. Additionally/alternatively, for example, if a plurality of PSFCH resources related to each different receiving UE identification information in the same RB overlap each other, the receiving UE may increase a cyclic shift index according to the increased value of L1-source ID mod X. Specifically, for example, the final cyclic shift index changed/determined by the receiving UE may be expressed as a sum of a value of L1-source ID mod X and a rounded down value of the receiving UE identification information (M)/Z. For example, the final cyclic shift index changed/determined by the receiving UE may be obtained based on Equation 5.

$$\text{The final cyclic shift index} = L1 \text{ source } ID \bmod X + \left\lfloor \frac{M}{Z} \right\rfloor \quad \text{[Equation 5]}$$

For example, the UE may perform the third grouping operation and/or the selection/determination operation of a PSFCH resource in the third group (or level 3-group) in units of RBs. Alternatively, for example, the UE may perform the third grouping operation and/or the selection/determination operation of a PSFCH resource in the third group (or level 3-group) in units of a combination of RBs and cyclic shifts. For example, the above form or operation method may be different based on at least one of the number of RBs corresponding to PSFCH resources constituting the second group (or level 2-group) and the total number of member IDs supportable in groupcast HARQ feedback mode 2 (pre-)configured for each resource pool, the number of member IDs per a subchannel allocated for one PSSCH, the number of cyclic shifts for CDM per a RB, the number of sub-channels in a resource pool, a period of PSFCH resources, and/or the size of the second group (or level 2-group).

For example, if the number of RBs corresponding to the second group (or level 2-group) is greater than X, the UE may perform the third grouping operation and/or the selection/determination operation of a PSFCH resource in the third group (or level 3-group) in units of RBs. For example, if the number of RBs corresponding to the second group (or level 2-group) is greater than a value obtained by multiplying a value of X by the total number of UEs supportable in groupcast HARQ feedback mode 2 (pre-)configured for each resource pool, the UE may perform the third grouping operation and/or the selection/determination operation of a PSFCH resource in the third group (or level 3-group) in units of RBs.

For example, if the number of RBs corresponding to the second group (or level 2-group) is greater than a value obtained by multiplying a value of X by the number of UEs per a sub-channel allocated fir one PSSCH, the UE may perform the third grouping operation and/or the selection/ determination operation of a PSFCH resource in the third group (or level 3-group) in units of RBs.

Except for the above cases, the UE may perform the third grouping operation and/or the selection/determination operation of a. PSFCH resource in the third group (or level 3-group) in units of a combination of RBs and cyclic shifts. In this case, for example, if the third grouping operation and/or the selection/determination operation of the PSFCH resource in the third group (or level 3-group) is performed in units of RBs, a cyclic shift may be set to a specific value, and a value of an RB may be derived/determined from a value of L1-source ID mod X and/or a group identification information value. For example, if the third grouping operation and/or the selection determination operation of the PSFCH resource in the third group (or level 3-group) is performed in units of a combination of RBs and cyclic shifts, a value of a cyclic shift and a value of an RB may be derived/determined from a value of L1-source ID mod X and/or group identification information. For example, as the member ID increases, the RB index may increase from the starting RB value derived by the value of L1-source ID mod X. Thereafter, if the number of RBs reaches the maximum RB value allocated for the value of L1-source ID mod X, the RB index may return to the starting RB value derived by the value of L1-source ID mod X again. In this case, for example, the value of the cyclic shift or the index of the cyclic shift may increase.

The above method for allocating/selecting/determining PSFCH resource(s) is only an embodiment, and some grouping steps may be omitted or group selection/determination process(es) based on specific parameter(s) may be omitted. Also, the order of the grouping steps may be different. Specifically, for example, a method of preventing collision between PSFCHs corresponding to PSSCHs and a method of distinguishing receiving UEs in groupcast may be processed in the same step.

For example, the transmitting UE and/or the receiving UE may perform the first grouping and the second grouping, and the transmitting UE and/or the receiving UE may select/determine a PSFCH resource in the level 2-group based on pairing information between the receiving UE and the transmitting UE for the PSSCH. For example, in the case of unicast, the pairing information may include a source ID and/or a destination ID. In this case, the transmitting UE which transmits the PSSCH may select/determine the PSFCH resource in the level 2-group based on a destination ID and a source ID of the transmitting UE. For example, the receiving UE which receives the PSSCH may select/determine the PSFCH resource in the level 2-group based on a destination ID and a source ID of the transmitting UE.

For example, in the case of groupcast, the pairing information may include a source ID and/or identifier information of a group. In this case, the transmitting UE which transmits the PSSCH may select/determine the PSFCH resource in the level 2-group based on a source ID of the transmitting UE and identifier information of the group in which the groupcast is performed. For example, the receiving UE which receives the PSSCH may select/determine the PSFCH resource in the level 2-group based on a source ID of the transmitting UE and identifier information of the group in which the groupcast is performed.

For example, the transmitting UE and/or the receiving UE may select/determine the level 3-group based on information related to the receiving UE for the PSSCH, and the transmitting UE and/or the receiving UE may select/determine the PSFCH resource in the level 3-group based on at least one of information related to the transmitting UE for the PSSCH, DMRS sequence information for the PSSCH, and/or DMRS sequence information for the PSSCH. Specifically, for example, the number of group steps for the PSFCH resource, a type of parameter(s) referenced for each group step, and/or a combination thereof, etc. may be configured or pre-configured for the UE for each resource pool.

Additionally, based on an embodiment of the present disclosure, if the PSFCH resource selection method corresponds to logical resources, a process of mapping the logical PSFCH resources to physical resources may be required again. In the above process, the size of the physical resources for PSFCHs may be smaller than the size of the logical resources in terms of a frequency domain, a time domain, and/or a code domain. If the size of the physical resources is smaller than the size of the logical resources, some PSFCH resources may overlap each other. The mapping process to the physical resources may be performed in units of all logical resources or may be performed for a group of a specific level. For example, in the case of the level 1-group and the level 2-group, it may not be allowed to overlap PSFCH resources between groups. In the case of the level 3-group, it may be allowed to overlap some PSFCH resources in a frequency domain, a time domain, and/or a code domain depending on the size of the physical resources.

Hereinafter, based on an embodiment of the present disclosure, operation(s) of the transmitting/receiving UE when selecting/determining the PSFCH resource(s) will be described in detail.

In terms of the transmitting UE, the transmitting UE may select/determine a set of RBs corresponding to a set of sub-channels according to PSSCH resource allocation as the level 1-group for the PSFCH. Additionally, the transmitting UE may select/determine the level 2-group based on the slot in which the PSSCH is transmitted in the selected/determined level 1-group. Additionally, the transmitting UE may select/determine the level 3-group in the selected level 2-group, based on transmission information on the PSSCH (e.g., a DMRS sequence or a source ID of the transmitting UE). In addition, if the PSSCH for unicast is transmitted or if the PSFCH resource is shared among a plurality of PSSCH receiving UEs in groupcast, the transmitting UE may select/determine a specific PSFCH resource in the level 3-group. If the PSFCH resource is divided between each of PSSCH receiving UEs in groupcast, the transmitting UE may receive HARQ feedback from PSSCH receiving UE(s) through PSFCH resource(s) that can be used in the level 3-group.

In terms of the receiving UE, the receiving UE may perform the group selection/determination in the same process to the level 3-group selection/determination as the transmitting UE. In addition, if the PSSCH for unicast is transmitted or if the PSFCH resource is shared among a plurality of PSSCH receiving UEs in groupcast, the receiving UE may select/determine a specific PSFCH resource in the level 3-group based on the same criteria as in the transmitting UE. If the PSFCH resource is divided between each of PSSCH receiving UEs in groupcast, each of receiving UEs may select/determine a PSFCH resource based on information related to a receiving UE (e.g., an identifier provided by a higher layer or a source ID of the receiving UE). The receiving UE may transmit HARQ feedback to the PSSCH transmitting UE by using the selected/determined PSFCH resource.

Meanwhile, in the HARQ-related set, the number and combination of sub-channels allocated for PSSCHs for each slot may be different. For example, in the HARQ related set, UE(s) may transmit a PSSCH through a sub-channel #1 to a sub-channel #6 in the first slot, and UE(s) may transmit a PSSCH through a sub-channel #4 to a sub-channel #9 in the second slot. In this case, a parameter combination and/or an applied order may be required for PSFCH resource allocation/selection/determination differently. Specifically, for example, for a specific starting sub-channel for a PSSCH, the UE may allocate PSFCH resources corresponding to different slots in the HARQ-related set in the same sub-channel. According to this method, even if the sub-channel combinations allocated for the PSSCH for each slot are different, the collision between the PSFCH resource sets can be efficiently managed/avoided.

Specifically, for example, the PSSCH transmitting UE may select/determine the level 1-group based on sub-channel(s) allocated for the PSSCH, and the PSSCH transmitting UE may select/determine the second group based on information related to the PSSCH transmitting UE (or information related to the receiving UE). In addition, the PSSCH transmitting UE may select/determine the third group based on slot information for the PSSCH, and the PSSCH transmitting UE may select/determine the final PSFCH resource based on information related to the PSSCH receiving UE (or information related to the transmitting UE).

Alternatively, for example, the PSSCH transmitting UE may select/determine the level 1-group based on sub-channel(s) allocated for the PSSCH, and the PSSCH transmitting UE may select/determine the second group based on information related to the PSSCH transmitting UE (or information related to the receiving UE). In addition, the PSSCH transmitting UE may select/determine the third group based on information related to the PSSCH receiving UE (or information related to the transmitting UE), and the PSSCH transmitting UE may select/determine the final PSFCH resource based on slot information for the PSSCH.

According to this method, if handling the PSSCH resource collision and/or allocating PSFCH resources for each receiving UE groupcast, the UE may reserve PSFCH resources for a plurality of sub-channels. Otherwise, for a specific PSSCH transmission, the UE may reserve PSFCH resources only in a specific sub-channel.

Based on various embodiments of the present disclosure, the UE(s) and/or the base station may group/manage PSFCH resources. Accordingly, an effect of efficiently supporting the HARQ operation may occur.

Figure 20:
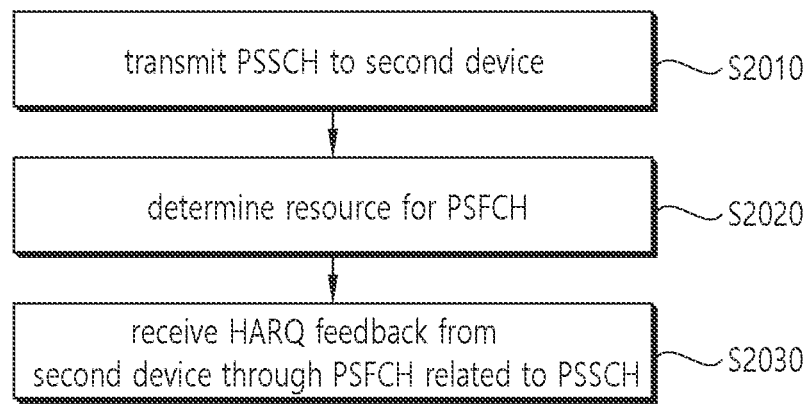
FIG. 20 shows a method for a first device to determine a resource for receiving HARQ feedback, based on an embodiment of the present disclosure.

FIG. 20 shows a method for a first device to determine a resource for receiving HARQ feedback, based on an embodiment of the present disclosure. The embodiment of FIG. 20 may be combined with various embodiments of the present disclosure.

Referring to FIG. 20, in step S2010, the first device 100 may transmit a PSSCH to the second device 200. In step S2020, the first device 100 may determine a resource for a PSFCH. The resource for the PSFCH may be determined based on at least one of the first grouping, the second grouping, or the third grouping. The first device 100 may determine the resource for the PSFCH based on various embodiments proposed in the present disclosure. In step S2030, the first device 100 may receive HARQ feedback from the second device 200 through the PSFCH related to the PSSCH. The order of the above steps may be changed.

Figure 21:
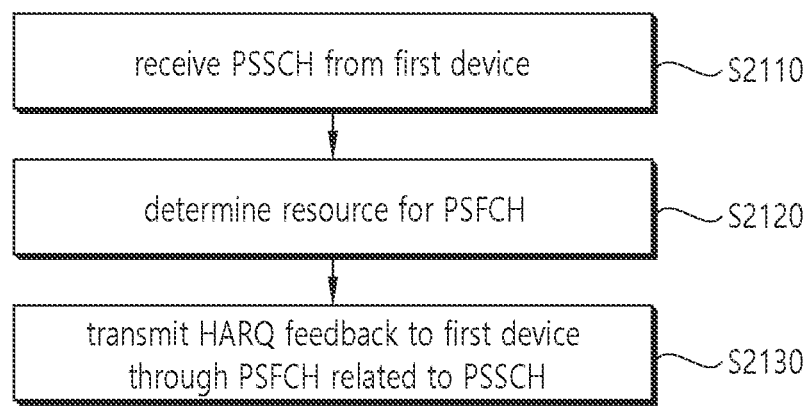
FIG. 21 shows a method for a second device to determine a resource for transmitting HARQ feedback, based on an embodiment of the present disclosure.

FIG. 21 shows a method for a second device to determine a resource for transmitting HARQ feedback, based on an embodiment of the present disclosure. The embodiment of FIG. 21 may be combined with various embodiments of the present disclosure.

Referring to FIG. 21, in step S2110, the second device 200 may receive a PSSCH from the first device 100. In step S2120, the second device 200 may determine a resource for a PSFCH. The resource fir the PSFCH may be determined based on at least one of the first grouping, the second grouping, or the third grouping. The second device 200 may determine the resource for the PSFCH based on various embodiments proposed in the present disclosure. In step S2130, the second device 200 may transmit HARQ feedback to the first device 100 through the PSFCH related to the PSSCH. The order of the above steps may be changed.

Figure 22:
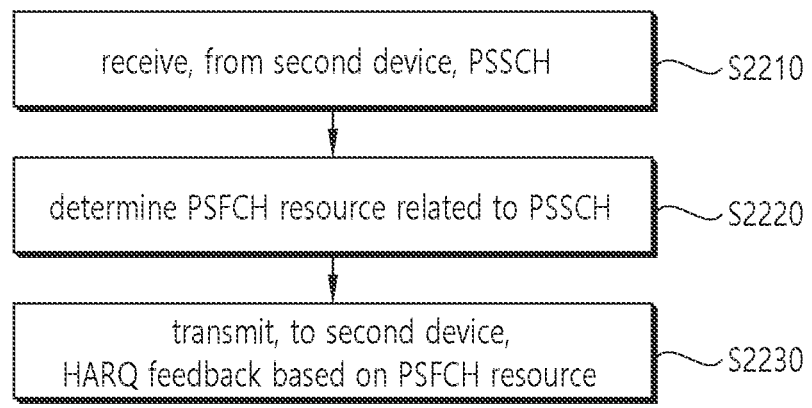
FIG. 22 shows a method for a first device to perform wireless communication, based on an embodiment of the present disclosure.

FIG. 22 shows a method for a first device to perform wireless communication, based on an embodiment of the present disclosure. The embodiment of FIG. 22 may be combined with various embodiments of the present disclosure.

Referring to FIG. 22, in step S2210, the first device may receive, from a second device, a physical sidelink shared channel (PSSCH). In step S2220, the first device may determine a physical sidelink feedback channel (PSFCH) resource related to the PSSCH. In step S2230, the first device may transmit, to the second device, hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

For example, based on Table 5, the first device may determine one or more PRBs for PSFCH transmission corresponding to the PSSCH received on the i-th slot and the j-th subchannel.

TABLE 5

A UE is provided by rbSetPSFCH a set of $M_{PRB,\ set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ PSSCH slots associated with a PSFCH slot, provided by periodPSFCHresource, the UE allocates the $[(i + j \cdot N_{PSSCH}^{PSFCH}) \cdot M_{subch,\ slot}^{PSFCH},\ (i + 1 + j \cdot N_{PSSCH}^{PSFCH}) \cdot M_{subch,\ slot}^{PSFCH} - 1]$ PRBs from the $M_{PRB,\ set}^{PSFCH}$ PRBs to slot i and sub-channel j, where $M_{subch,\ slot}^{PSFCH} = M_{PRB,\ set}^{PSFCH}/(N_{subch} \cdot N_{PSSCH}^{PSFCH})$, $0 \leq i < N_{PSSCH}^{PSFCH}$, $0 \leq j < N_{subch}$, and the allocation starts in an ascending order of i and continues in an ascending order of j. The UE expects that $M_{PRB,\ set}^{PSFCH}$ is a multiple of $N_{subch} \cdot N_{PSSCH}^{PSFCH}$.

In addition, based on Table 6, the first device may determine the number of available PSFCH resources.

TABLE 6

A UE determines a number of PSFCH resources available for multiplexing HARQ-ACK information in a PSFCH transmission as $R_{PRB, CS}^{PSFCH} = N_{type}^{PSFCH} \cdot M_{subch, slot}^{PSFCH} \cdot N_{CS}^{PSFCH}$ where $N_{CS}^{PSFCH}$ is a number of cyclic shift pairs for the resource pool and, based on an indication by higher layers,
$N_{type}^{PSFCH} = 1$ and the $M_{subch, slot}^{PSFCH}$ PRBs are associated with the starting sub-channel of the corresponding PSSCH
$N_{type}^{PSFCH} = N_{subch}^{PSSCH}$ and the $N_{subch}^{PSSCH} \cdot M_{subch, slot}^{PSFCH}$ PRBs are associated with one or more sub-channels from the $N_{subch}^{PSSCH}$ sub-channels of the corresponding PSSCH
The PSFCH resources are first indexed according to an ascending order of the PRB index, from the $N_{type}^{PSFCH} \cdot M_{subch, slot}^{PSFCH}$ PRBs, and then according to an ascending order of the cyclic shift pair index from the $N_{CS}^{PSFCH}$ cyclic shift pairs.

In addition, the first device may determine an index of the PSFCH resource based on Table 7. In addition, the first device may transmit HARQ feedback on the PSFCH resource corresponding to the index. Additionally, if the index is related to a specific cyclic shift, the first device may transmit HARQ feedback to which the specific cyclic shift is applied, based on the PSFCH resource corresponding to the index.

TABLE 7

A UE determines an index of a PSFCH resource for a PSFCH transmission in response to a PSSCH reception, as $(P_{ID} + M_{ID}) \mod R_{PRB, CS}^{PSFCH}$ where $P_{ID}$ is a physical layer source ID provided by SCI format 0_2 scheduling the PSSCH reception, $M_{ID}$ is zero or $M_{ID}$ is the identity of the UE receiving the PSSCH as indicated by higher layers.

For example, each subchannel for the PSSCH may be related to each first PSFCH resource including the at least one second PSFCH resource. For example, a plurality of subchannels for the PSSCH may be related to one first PSFCH resource among the at least one first PSFCH resource including the at least one second PSFCH resource.

For example, a size of the second PSFCH resource may be a value which is obtained by dividing a number of resource blocks (RBs) included in a set of PSFCH resources by a value which is obtained by multiplying a number of subchannels in a resource pool by a period of the PSFCH resource. For example, the size of the second PSFCH resource may be a number of RBs included in the second PSFCH resource. For example, the period of the PSFCH resource may be a number of PSSCH slots related to a slot including the PSFCH resource.

For example, the PSFCH resource may be one RB, determined based on the source ID of the second device, among at least one second PSFCH resource related to the at least one subchannel and the at least one slot for the PSSCH.

For example, the PSFCH resource may be determined based on the information related to the at least one subchannel for the PSSCH, the information related to the at least one slot for the PSSCH, the source ID of the second device, and an ID of the first device. For example, the ID of the first device may be an ID for identifying the first device within a group related to groupcast communication.

Additionally, for example, the first device may determine information related to a cyclic shift applied to the HARQ feedback on the PSFCH resource. For example, the information related to the cyclic shift applied to the HARQ feedback on the PSFCH resource may be determined based on the information related to the at least one subchannel for the PSSCH, the information related to the at least one slot for the PSSCH, and the source ID of the second device. For example, the information related to the cyclic shift applied to the HARQ feedback on the PSFCH resource may be determined based on the information related to the at least one subchannel for the PSSCH, the information related to the at least one slot for the PSSCH, the source ID of the second device, and an ID of the first device. For example, the ID of the first device may be an ID for identifying the first device within a group related to groupcast communication. For example, the HARQ feedback may be transmitted to the second device on the PSFCH resource based on the information related to the cyclic shift.

The proposed method can be applied to the device(s) described below. First, the processor 102 of the first device 100 may control the transceiver 106 to receive, from a second device, a physical sidelink shared channel (PSSCH). In addition, the processor 102 of the first device 100 may determine a physical sidelink feedback channel (PSFCH) resource related to the PSSCH. In addition, the processor 102 of the first device 100 may control the transceiver 106 to transmit, to the second device, hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a physical sidelink shared channel (PSSCH); determine a physical sidelink feedback channel (PSFCH) resource related to the PSSCH; and transmit, to the second device, hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE, a physical sidelink shared channel (PSSCH); determine a physical sidelink feedback channel (PSFCH) resource related to the PSSCH; and transmit, to the second UE, hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second UE.

Based on an embodiment of the present disclosure, a non-transitory computer-readable storage medium storing instructions may be provided. For example, the instructions, when executed, may cause a first device to: receive, from a second device, a physical sidelink shared channel (PSSCH); determine a physical sidelink feedback channel (PSFCH) resource related to the PSSCH; and transmit, to the second device, hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Figure 23:
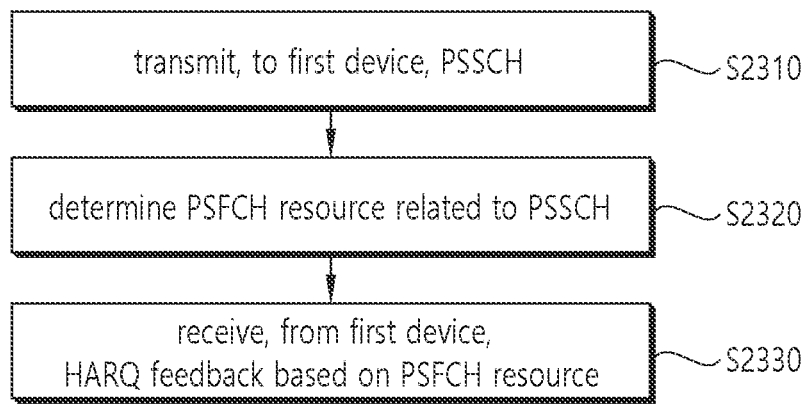
FIG. 23 shows a method for a second device to perform wireless communication, based on an embodiment of the present disclosure.

FIG. 23 shows a method for a second device to perform wireless communication, based on an embodiment of the present disclosure. The embodiment of FIG. 23 may be combined with various embodiments of the present disclosure.

Referring to FIG. 23, in step S2310, the second device may transmit, to a first device, a physical sidelink shared channel (PSSCH). In step S2320, the second device may determine a physical sidelink feedback channel (PSFCH) resource related to the PSSCH. In step S2330, the second device may receive, from the first device, a hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

For example, each subchannel for the PSSCH may be related to each first PSFCH resource including the at least one second PSFCH resource. For example, a plurality of subchannels for the PSSCH may be related to one first PSFCH resource among the at least one first PSFCH resource including the at least one second PSFCH resource. For example, a size of the second PSFCH resource may be a value which is obtained by dividing a number of resource blocks (RBs) included in a set of PSFCH resources by a value which is obtained by multiplying a number of subchannels in a resource pool by a period of the PSFCH resource.

For example, based on Table 5, the second device may determine one or more PRBs for PSFCH reception corresponding to the PSSCH transmitted on the i-th slot and the j-th subchannel. In addition, based on Table 6, the second device may determine the number of available PSFCH resources. In addition, the second device may determine an index of the PSFCH resource based on Table 7. In addition, the second device may receive HARQ feedback on the PSFCH resource corresponding to the index. Additionally, if the index is related to a specific cyclic shift, the second device may receive HARQ feedback to which the specific cyclic shift is applied, based on the PSFCH resource corresponding to the index.

The proposed method can be applied to the device(s) described below. First, the processor 202 of the second device 200 may control the transceiver 206 to transmit, to a first device, a physical sidelink shared channel (PSSCH). In addition, the processor 202 of the second device 200 may determine a physical sidelink feedback channel (PSFCH) resource related to the PSSCH. In addition, the processor 202 of the second device 200 may control the transceiver 206 to receive, from the first device, a hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a physical sidelink shared channel (PSSCH); determine a physical sidelink feedback channel (PSFCH) resource related to the PSSCH; and receive, from the first device, a hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: transmit, to a first UE, a physical sidelink shared channel (PSSCH); determine a physical sidelink feedback channel (PSFCH) resource related to the PSSCH; and receive, from the first UE, a hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second UE.

Based on an embodiment of the present disclosure, a non-transitory computer-readable storage medium storing instructions may be provided. For example, the instructions, when executed, may cause a second device to: transmit, to a first device, a physical sidelink shared channel (PSSCH); determine a physical sidelink feedback channel (PSFCH) resource related to the PSSCH; and receive, from the first device, a hybrid automatic repeat request (HARQ) feedback based on the PSFCH resource. For example, at least one subchannel for the PSSCH may be related to at least one first PSFCH resource including at least one second PSFCH resource, and each second PSFCH resource included in the at least one first PSFCH resource may be related to each slot on the at least one subchannel. For example, the PSFCH resource may be determined based on information related to the at least one subchannel for the PSSCH, information related to at least one slot for the PSSCH, and a source ID of the second device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
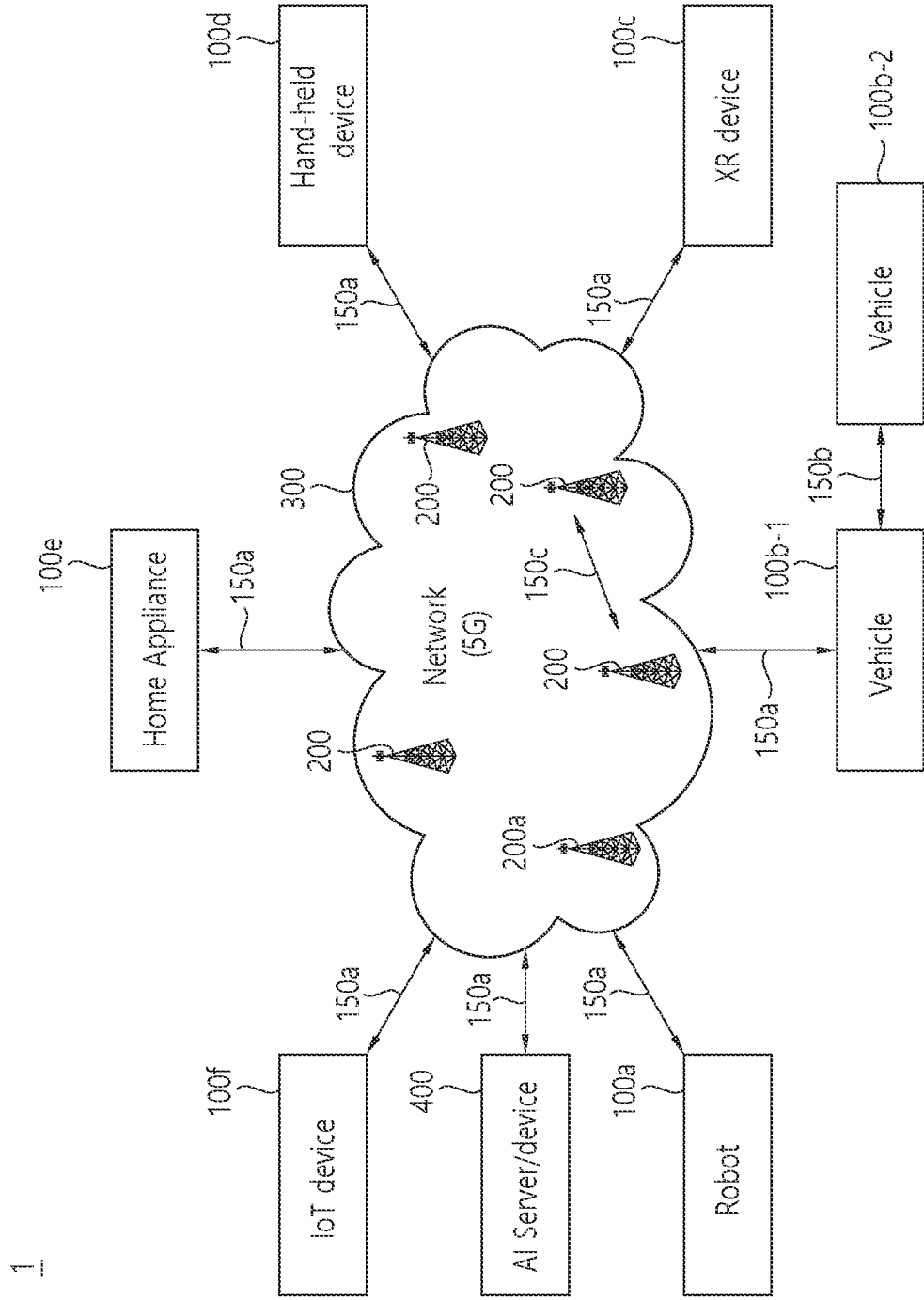
FIG. 24 shows a communication system 1, based on an embodiment of the present disclosure.

FIG. 24 shows a communication system 1, based on an embodiment of the present disclosure.

Referring to FIG. 24, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication), The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
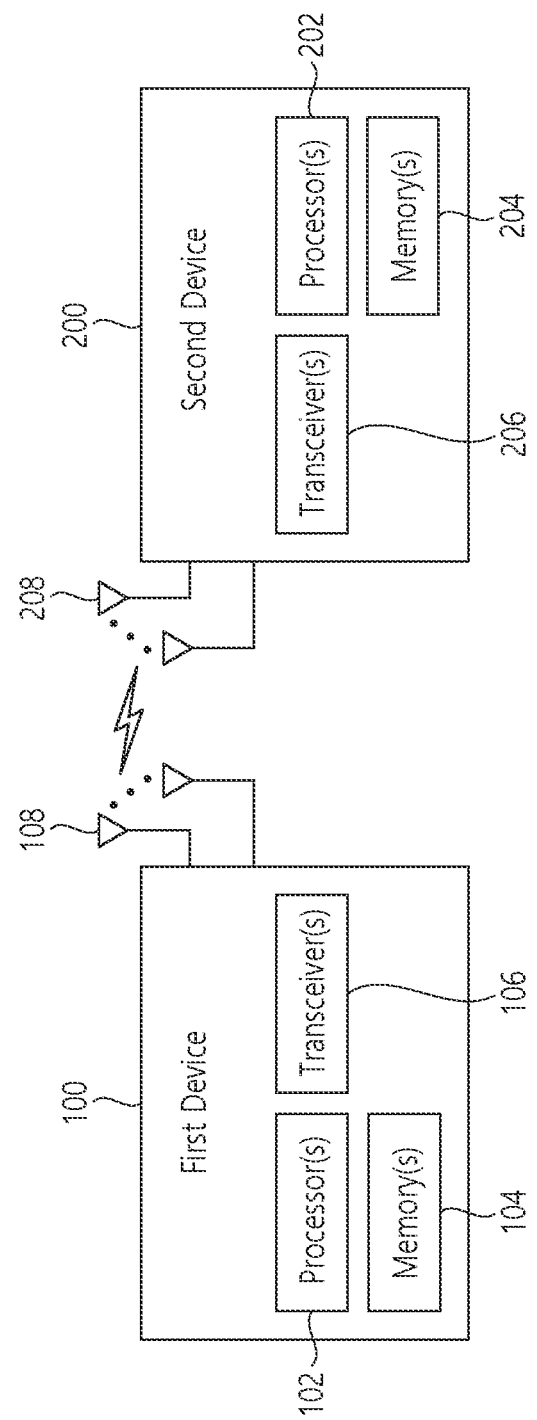
FIG. 25 shows wireless devices, based on an embodiment of the present disclosure.

FIG. 25 shows wireless devices, based on an embodiment of the present disclosure.

Referring to FIG. 25, a first wireless device 100 and a second wireless device 200 may transmit radio signals through a variety of RATS (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processors) 102 may control the memory(s) 104 and/or the transceivers) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMS), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 26:
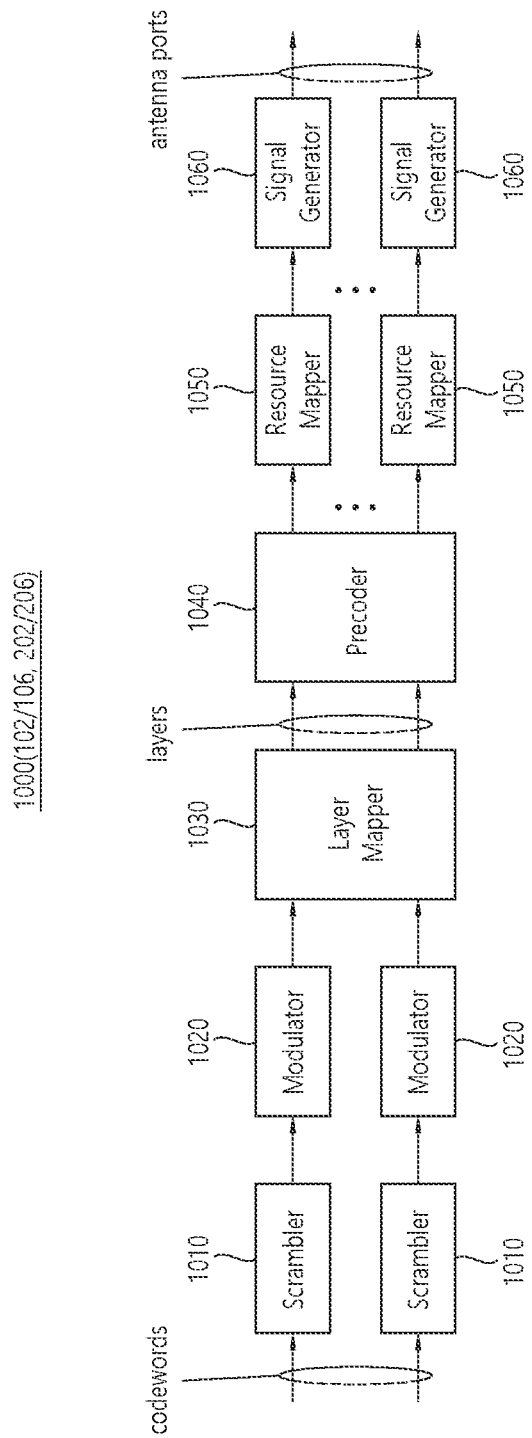
FIG. 26 shows a signal process circuit for a transmission signal, based on an embodiment of the present disclosure.

FIG. 26 shows a signal process circuit for a transmission signal, based on an embodiment of the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
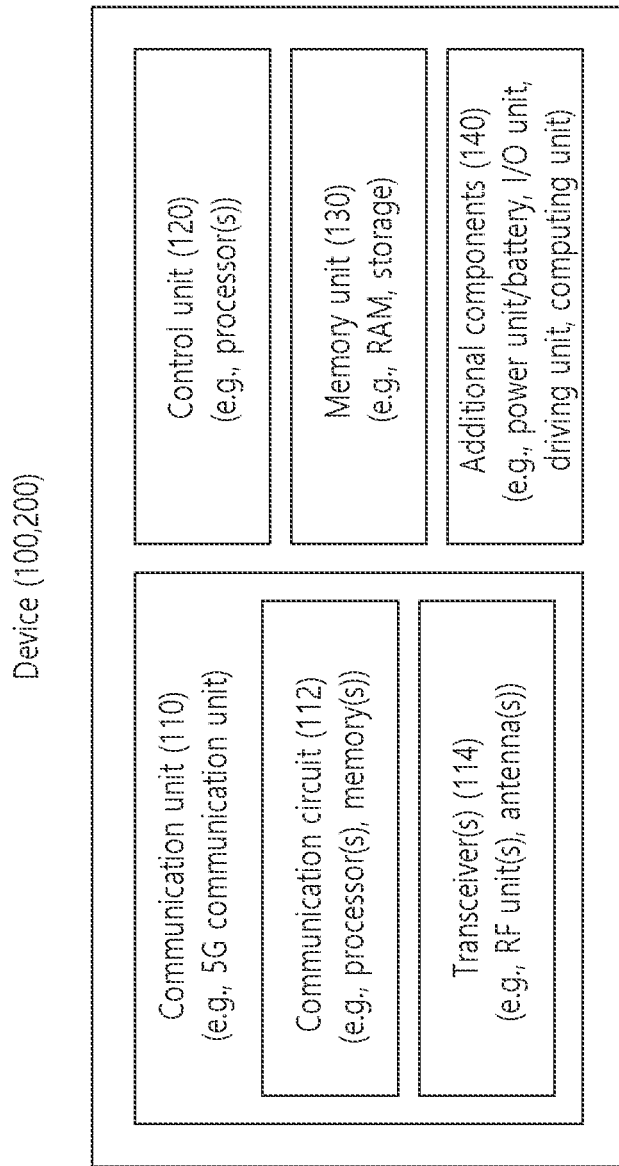
FIG. 27 shows another example of a wireless device, based on an embodiment of the present disclosure.

FIG. 27 shows another example of a wireless device, based on an embodiment of the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
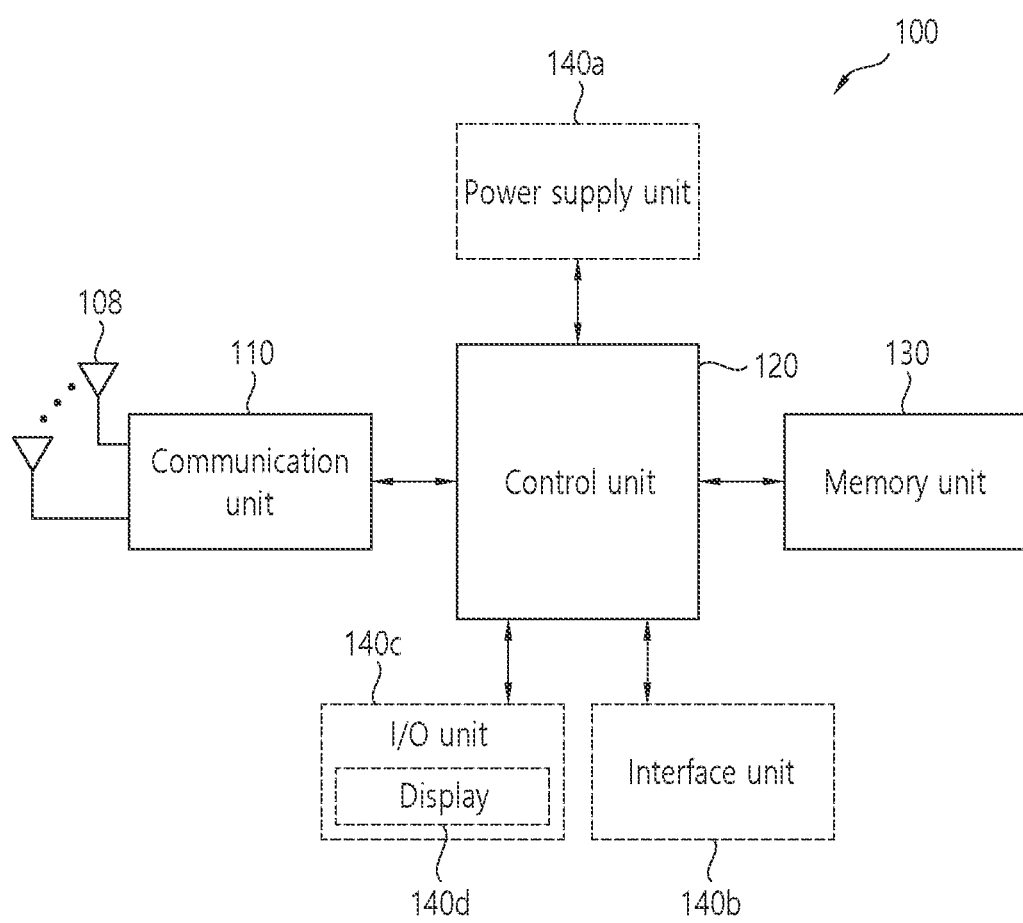
FIG. 28 shows a hand-held device, based on an embodiment of the present disclosure.

FIG. 28 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
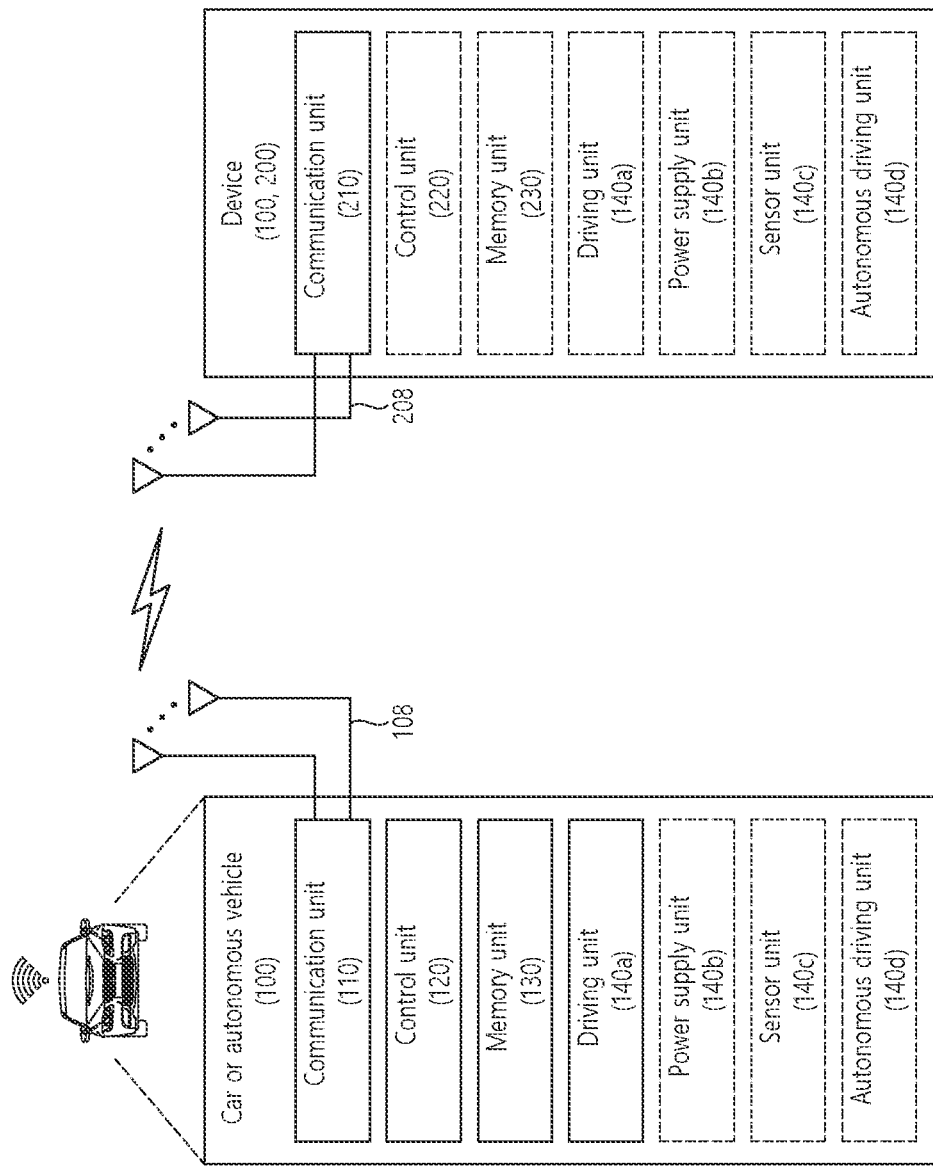
FIG. 29 shows a vehicle or an autonomous vehicle, based on an embodiment of the present disclosure.

FIG. 29 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 29, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles. BSs gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    obtaining a set of physical resource blocks (PRBs) in a resource pool for physical sidelink feedback channel (PSFCH) transmission;
    allocating, for a number of sub-channels for the resource pool and a number of physical sidelink shared channel (PSSCH) slots related to a PSFCH slot, M PRBs including m-th to n-th PRBs from the set of PRBs to an i-th slot among the PSSCH slots related to the PSFCH slot and a j-th sub-Channel,
    wherein m and n are obtained based on:

$m=(i+j\cdot N)\cdot M$ $n=(i+1+j\cdot N\cdot M-1)$ wherein N is a PSFCH period, M is a positive integer, i is an integer greater than or equal to zero and less than N, and j is an integer greater than or equal to zero and less than the number of sub-channels for the resource pool;
    receiving, based on a slot and at least one sub-channel, a PSSCH from a second device;
    determining, based on the allocation related to the PSSCH, a number of PSFCH resources available for multiplexing hybrid automatic repeat request (HARQ)-acknowledgement (ACK) information in the PSFCH transmission; and
    determining, among the PSFCH resources, an index of a PSFCH resource for the PSFCH transmission in response to the reception of the PSSCH, based on a source identifier (ID) of the second device.

2. The method of claim 1, further comprising:
    performing the PSFCH transmission based on the PSFCH resource.

3. The method of claim 1, wherein the allocation starts in an ascending order of i and continues in an ascending order of j.

4. The method of claim 1, wherein the M PRBs are related to a starting sub-channel of the PSSCH.

5. The method of claim 1, wherein K PRBs are related to the at least one sub-channel of the PSSCH, and
    wherein K is obtained by multiplying M and a number of the at least one sub-channel.

6. The method of claim 1, wherein M is a value obtained by dividing a number of PRBs included in the set of PRBs by a value which is obtained by multiplying the number of sub-channels for the resource pool and the PSFCH period.

7. The method of claim 1, wherein the PSFCH period is the number of PSSCH slots related to the PSFCH slot.

8. The method of claim 1, wherein the PSFCH resource is one RB determined based on the source ID of the second device.

9. The method of claim 1, wherein the PSFCH resource is determined, among the PSFCH resources, further based on an ID of the first device.

10. The method of claim 9, wherein the ID of the first device is an ID for identifying the first device within a group related to groupcast communication.

11. The method of claim 1, further comprising:
    determining information related to a cyclic shift applied to the HARQ-ACK information that is transmitted on the PSFCH resource.

12. The method of claim 11, wherein the information related to the cyclic shift applied to the HARQ-ACK information is determined based on the source ID of the second device.

13. The method of claim 12, wherein the information related to the cyclic shift applied to the HARQ-ACK information is determined further based on an ID of the first device.

14. The method of claim 11, wherein the HARQ-ACK information is transmitted to the second device on the PSFCH resource based on the information related to the cyclic shift.

15. A first device adapted to perform wireless communication, the first device comprising:
    at least one transceiver;
    at least one processor; and
    at least one memory storing instructions that, based on being executed by the at least one processor, control the first device to perform operations comprising:
        obtaining a set of physical resource blocks (PRBs) in a resource pool for physical sidelink feedback channel (PSFCH) transmission;
        allocating, for a number of sub-channels for the resource pool and a number of physical sidelink shared channel (PSSCH) slots related to a PSFCH slot, M PRBs including m-th to n-th PRBs from the set of PRBs to an i-th slot among the PSSCH slots related to the PSFCH slot and a j-th sub-channel, wherein m and n are obtained based on:

$$m=(i+j \cdot N) \cdot M$$

$$n=(i+1+j \cdot N) \cdot M-1$$

wherein N is a PSFCH period, M is a positive integer, i is an integer greater than or equal to zero and less than N, and j is an integer greater than or equal to zero and less than the number of sub-channels for the resource pool;

receiving, based on a slot and at least one sub-channel, a PSSCH from a second device;

determining, based on the allocation related to the PSSCH, a number of PSFCH resources available for multiplexing hybrid automatic repeat request (HARQ)-acknowledgement (ACK) information in the PSFCH transmission; and determining, among the PSFCH resources, an index of a PSFCH resource for the PSFCH transmission in response to the reception of the PSSCH, based on a source identifier (ID) of the second device.

16. The first device of claim 15, wherein the allocation starts in an ascending order of and continues in an ascending order of j.

17. The first device of claim 15, wherein M is a value obtained by dividing a number of PRBs included in the set of PRBs by a value which is obtained by multiplying the number of sub-channels for the resource pool and the PSFCH period.

18. At least one memory storing instructions that, based on being executed by at least one processor, control a first device to perform operations for wireless communications, the operations comprising:

obtaining a set of physical resource blocks (PRBs) in a resource pool for physical sidelink feedback channel (PSFCH) transmission;

allocating, for a number of sub-channels for the resource pool and a number of physical sidelink shared channel (PSSCH) slots related to a PSFCH slot, M PRBs including m-th to n-th PRBs from the set of PRBs to an i-th slot among the PSSCH slots related to the PSFCH slot and a j-th sub-channel, wherein m and n are obtained based on:

$$m=(i+j \cdot N) \cdot M$$

$$n=(i+1+j \cdot N) \cdot M-1$$

wherein N is a PSFCH period, M is a positive integer, i is an integer greater than or equal to zero and less than N, and j is an integer greater than or equal to zero and less than the number of sub-channels for the resource pool;

receiving, based on a slot and at least one sub-channel, a PSSCH from a second device;

determining, based on the allocation related to the PSSCH, a number of PSSCH resources available for multiplexing hybrid automatic repeat request (HARQ)-acknowledgement (ACK) information in the PSFCH transmission; and determining, among the PSFCH resources, an index of a PSFCH resource for the PSFCH transmission in response to the reception of the PSSCH, based on a source identifier (ID) of the second device.

19. The at least one memory of claim 18, wherein the allocation starts in an ascending order of i and continues in an ascending order of j.

20. The at least one memory of claim 18, wherein M is a value obtained by dividing a number of PRBs included in the set of PRBs by a value which is obtained by multiplying the number of sub-channels for the resource pool and the PSFCH period.

* * * * *

UNITED STATES PATENT AND TRADEMARK OFFICE
CERTIFICATE OF CORRECTION

| | | |
|---|---|---|
| PATENT NO. | : 11,870,571 B2 | Page 1 of 1 |
| APPLICATION NO. | : 17/967055 | |
| DATED | : January 9, 2024 | |
| INVENTOR(S) | : Daesung Hwang, Seungmin Lee and Hanbyul Seo | |

It is certified that error appears in the above-identified patent and that said Letters Patent is hereby corrected as shown below:

In the Claims

Column 43, Line 62; Claim 1, after "$n = (i + 1 + j \cdot N$" insert -- ) --.

Signed and Sealed this
Twentieth Day of May, 2025

Coke Morgan Stewart
*Acting Director of the United States Patent and Trademark Office*